US 9,010,869 B2

(12) United States Patent
Phillip et al.

(10) Patent No.: US 9,010,869 B2
(45) Date of Patent: Apr. 21, 2015

(54) SOLUTION MINING OF ORE CONTAINING SODIUM CARBONATE AND BICARBONATE

(71) Applicant: Solvay SA, Brussels (BE)

(72) Inventors: James D. Phillip, Green River, WY (US); Alain Vandendoren, Brussels (BE)

(73) Assignee: Solvay SA, Brussels (BE)

( * ) Notice: Subject to any disclaimer, the term of this patent is extended or adjusted under 35 U.S.C. 154(b) by 30 days.

(21) Appl. No.: 13/726,005

(22) Filed: Dec. 21, 2012

(65) Prior Publication Data

US 2013/0171048 A1 Jul. 4, 2013

Related U.S. Application Data

(60) Provisional application No. 61/579,652, filed on Dec. 23, 2011, provisional application No. 61/579,654, filed on Dec. 23, 2011.

(51) Int. Cl.
*E21B 43/28* (2006.01)
*C01D 7/12* (2006.01)
*E21B 43/34* (2006.01)

(52) U.S. Cl.
CPC .............. *E21B 43/28* (2013.01); *E21B 43/283* (2013.01); *C01D 7/12* (2013.01); *C01D 7/126* (2013.01); *E21B 43/34* (2013.01)

(58) Field of Classification Search
USPC ................................................ 299/3–5, 7, 8
See application file for complete search history.

(56) References Cited

U.S. PATENT DOCUMENTS

| | | | |
|---|---|---|---|
| 2,388,009 A | 10/1945 | Pike | |
| 2,625,384 A | 1/1953 | Pike et al. | |
| 3,184,287 A | 5/1965 | Gancy | |
| 3,953,073 A | 4/1976 | Kube | |
| 4,398,769 A | 8/1983 | Jacoby | |
| 4,401,635 A | 8/1983 | Frint | |
| 4,498,706 A | 2/1985 | Ilardi et al. | |
| 4,584,077 A | 4/1986 | Chlanda et al. | |
| 4,636,289 A | 1/1987 | Mani et al. | |
| 4,652,054 A | 3/1987 | Copenhafer et al. | |
| 4,815,790 A * | 3/1989 | Rosar et al. | 299/4 |
| 5,246,273 A * | 9/1993 | Rosar | 299/4 |
| 5,766,270 A | 6/1998 | Neuman et al. | |
| 5,888,368 A | 3/1999 | Posar | |
| 5,955,043 A | 9/1999 | Neuman et al. | |
| 6,251,346 B1 | 6/2001 | Neuman et al. | |

(Continued)

*Primary Examiner* — David Bagnell
*Assistant Examiner* — Michael Goodwin
(74) *Attorney, Agent, or Firm* — Beatrice C. Ortego

(57) ABSTRACT

A solution mining method for recovering alkali values from a cavity of an underground ore formation comprising trona and/or wegscheiderite; a manufacturing process using such method to make sodium-based product(s); and a sodium-based product obtained therefrom. The method comprises: an ore dissolution phase (a) in which the incongruent double-salt in trona and/or wegscheiderite is dissolved from an ore face in a first solvent, and a cavity cleaning phase (b) in which sodium bicarbonate deposited on the ore face during the dissolution phase (a) is dissolved into a second aqueous solvent having a higher pH, hydroxide content, and/or temperature and is partly or completely converted in situ to sodium carbonate. The method further comprises withdrawing a liquor resulting from either phase to the ground surface, optionally recycling some liquor to the cavity; and passing some liquor through a crystallizer, a reactor, and/or an electrodialyser, to form at least one sodium-based product which is recovered.

19 Claims, 6 Drawing Sheets

Phase (a)

(56) References Cited

U.S. PATENT DOCUMENTS

| | | |
|---|---|---|
| 6,322,767 B1 * | 11/2001 | Neuman et al. ............... 423/421 |
| 6,428,759 B1 * | 8/2002 | Smith et al. ................ 423/206.2 |
| 6,609,761 B1 | 8/2003 | Ramey et al. |
| 6,924,318 B2 | 8/2005 | Mischi et al. |
| 7,611,208 B2 | 11/2009 | Day et al. |
| 8,057,765 B2 | 11/2011 | Day et al. |
| 8,678,513 B2 * | 3/2014 | Hughes et al. ................... 299/5 |
| 2003/0143149 A1 * | 7/2003 | Braman et al. ............... 423/426 |
| 2010/0282614 A1 | 11/2010 | Detournay et al. |
| 2010/0284891 A1 | 11/2010 | Detournay et al. |
| 2011/0127825 A1 | 6/2011 | Hughes et al. |
| 2011/0250109 A1 | 10/2011 | Detournay et al. |

* cited by examiner

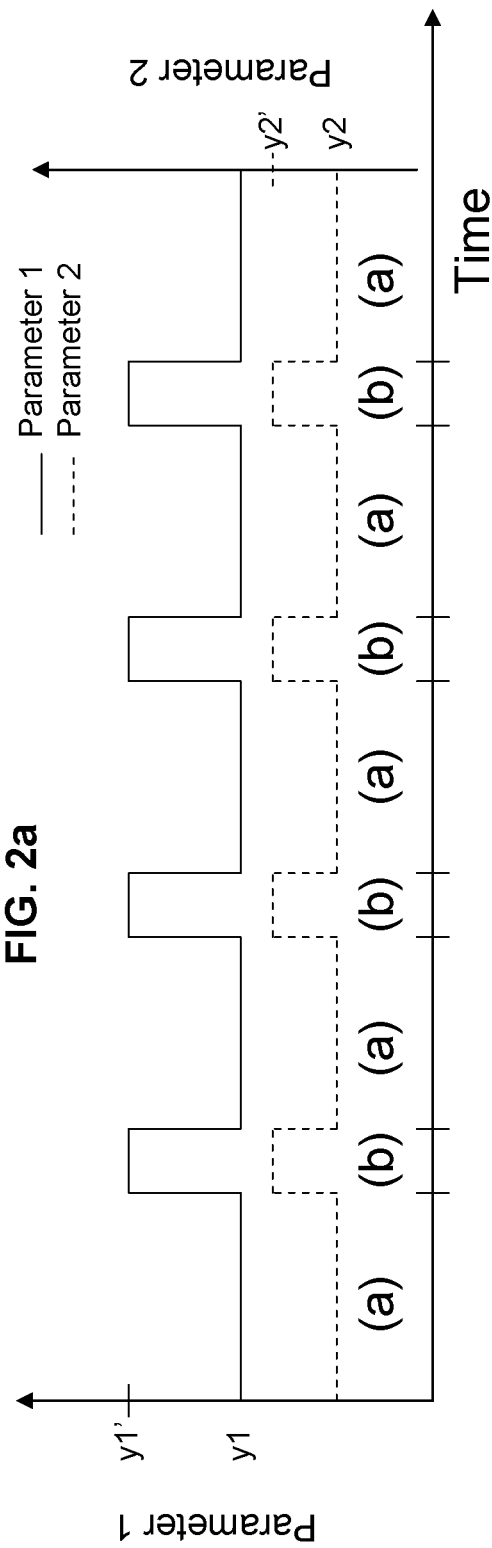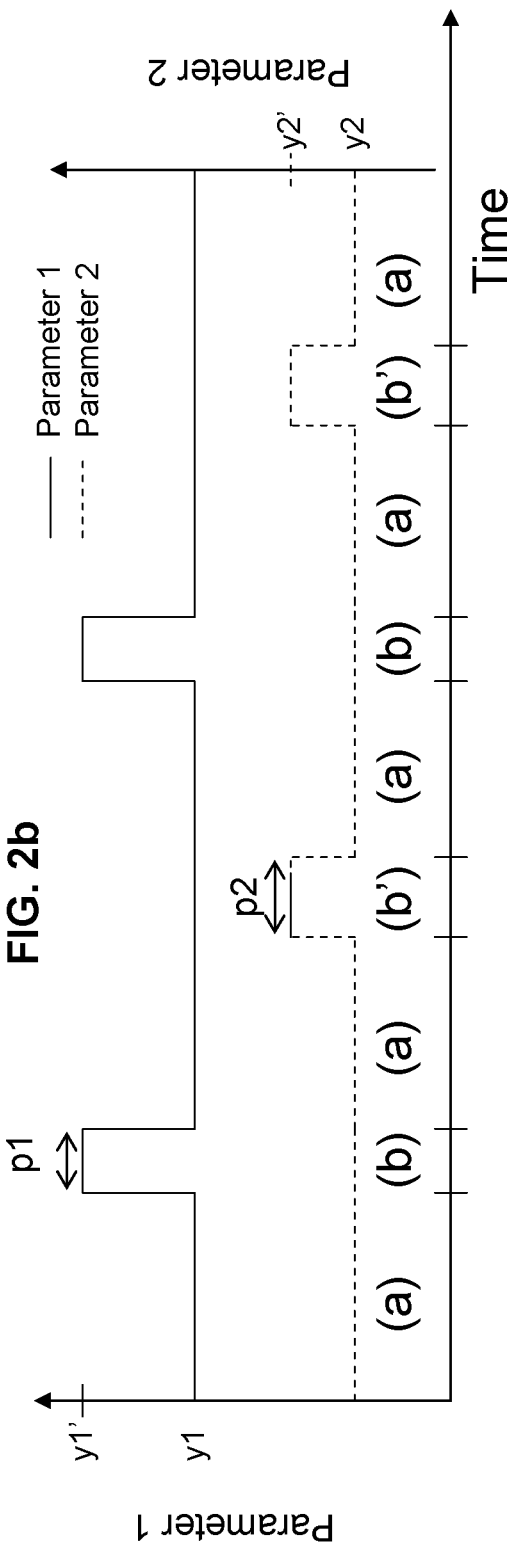

SOLUTION MINING OF ORE CONTAINING SODIUM CARBONATE AND BICARBONATE

CROSS-REFERENCE TO RELATED APPLICATIONS

The present application claims priority to U.S. provisional application No. 61/579,652 filed Dec. 23, 2011 and to U.S. provisional application No. 61/579,654 filed Dec. 23, 2011, the whole content of each of these applications being incorporated herein by reference for all purposes.

TECHNICAL FIELD

The present invention relates to a method for recovery of alkali values via solution mining of an ore containing a double-salt of sodium carbonate and sodium bicarbonate, e.g., trona or Wegscheiderite, such method addressing the issue of incongruent dissolution of this double-salt.

BACKGROUND

Subterranean deposits comprising both sodium carbonate and sodium bicarbonate vary in composition from one location to another as might be expected, however, the major commercially developable deposits generally have one of two basic compositions. One of the naturally-occurring sodium (bi)carbonate mineral is known as "Wegscheiderite" and may be also called "decemite". This mineral contains 29.6% $Na_2CO_3$ and 70.4% $NaHCO_3$ by weight in the form of three molecules of $NaHCO_3$ for each molecule of $Na_2CO_3$ as follows: $Na_2CO_3.3NaHCO_3$.

The second sodium (bi)carbonate mineral is the naturally-occurring mineral called "trona". Crude trona is a mineral that may contain up to 99% of sodium sesquicarbonate (generally about 70-99%). Sodium sesquicarbonate is a sodium carbonate—sodium bicarbonate double salt having the formula ($Na_2CO_3.NaHCO_3.2H_2O$) and which contains 46.90 wt. % $Na_2CO_3$, 37.17 wt. % $NaHCO_3$ and 15.93 wt. % $H_2O$. Crude trona also contains, in lesser amounts, sodium chloride (NaCl), sodium sulfate ($Na_2SO_4$), organic matter, and insolubles such as clay and shales. A typical analysis of the trona ore mined in Green River is shown in TABLE 1. Trona is important from a commercial standpoint in the United States at least due to the very large deposits in the State of Wyoming. The most valuable alkali produced from trona is sodium carbonate ($Na_2CO_3$). Sodium carbonate is one of the largest volume alkaline commodities produced in the United States. In 2007, trona-based sodium carbonate from Wyoming comprised about 91% of total U.S. soda ash production. Sodium carbonate finds major use in the glass-making industry and for the production of baking soda, detergents and paper products. Other products such as sodium bicarbonate ($NaHCO_3$), sodium sulfite ($Na_2SO_3$), caustic soda (NaOH), sodium sesquicarbonate ($Na_2CO_3.NaHCO_3.2H_2O$), a sodium phosphate ($Na_5P_3O_{10}$) or other sodium-containing chemicals may be produced from trona as well.

TABLE 1

| Constituent | Weight Percent |
| --- | --- |
| $Na_2CO_3$ | 43.2-45 |
| $NaHCO_3$ | 33.7-36 |
| $H_2O$ (crystalline and free moisture) | 15.3-15.6 |
| NaCl | 0.004-0.1 |
| $Na_2SO_4$ | 0.005-0.01 |
| Insolubles | 3.6-7.3 |

TABLE 1-continued

Most mining operations practiced some form of underground ore mechanical extraction using techniques adapted from the coal mining industry. A variety of different systems and mining techniques (such as longwall mining, shortwall mining, room-and-pillar mining, or various combinations) exist for mechanically mining ore containing sodium (bi)carbonate from underground formations. The large deposits of mineral trona in southwestern Wyoming near Green River Basin have been mechanically mined since the late 1940's and have been exploited by five separate mining operations over the intervening period. The nominal depth below surface of these mining operations ranges between approximately 800 feet to 2000 feet. Although any of these various mining techniques may be employed to mine trona ore, when a mechanical mining technique is used, it is preferably longwall mining.

To recover these valuable alkali products, the so-called 'monohydrate' commercial process is frequently used to produce soda ash from trona. When the trona is mechanically mined, crushed trona ore is calcined (i.e., heated) to convert sodium bicarbonate into sodium carbonate, drive off water of crystallization and form crude soda ash. The crude soda ash is then dissolved in water and the insoluble material is separated from the resulting solution. A clear solution of sodium carbonate is fed to a monohydrate crystallizer, e.g., a high temperature evaporator system generally having one or more effects (sometimes called 'evaporator-crystallizer'), where some of the water is evaporated and some of the sodium carbonate forms into sodium carbonate monohydrate crystals ($Na_2CO_3.H_2O$). The sodium carbonate monohydrate crystals are removed from the mother liquor and then dried to convert the crystals to dense soda ash. Most of the mother liquor is recycled back to the evaporator system for additional processing into sodium carbonate monohydrate crystals.

Longwall mining, shortwall mining, and room-and-pillar mining require miners and heavy machinery to be underground. The cost of the mechanical mining methods for trona is high, representing as much as 40 percent of the production costs for soda ash. Furthermore, recovering trona by these methods becomes more difficult as the thickest beds (more readily accessible reserves) of trona deposits with a high quality (less contaminants) were exploited first and are now being depleted. Thus the production of sodium carbonate using the combination of mechanical mining techniques followed by the monohydrate process is becoming more expensive, as the higher quality trona deposits become depleted and labor and energy costs increase. Furthermore, development of new reserves is expensive, requiring a capital investment of as much as hundreds of million dollars to sink new mining shafts and to install related mining and safety (ventilation) equipment.

Recognizing the economic and physical limitations of underground mechanical mining techniques, various solution mining techniques have been proposed. Solution mining allows the recovery of sodium values from underground formation comprising water-soluble ore without the need for sinking costly mining shafts and employing workers in underground mines. In its simplest form, solution mining comprises injecting water or an aqueous solution into a cavity of the underground formation, allowing the solution to dissolve as much water-soluble ore as possible, pumping the resulting brine to the surface, and recovering the dissolved ore from the brine.

With respect to ores containing sodium carbonate and sodium bicarbonate (sometimes termed 'sodium (bi)carbonate-containing ore), while trona is more soluble than Wegscheiderite in water at room temperature, these ores are still of relatively low solubility when compared with other naturally-occurring minerals mined "in situ" with solution mining techniques, such as halite (mostly sodium chloride) and potash (mostly potassium chloride). Thus implementing a solution mining technique to exploit sodium (bi)carbonate-containing ores, especially those that would not be economically viable to mine via mechanical mining techniques, is quite challenging.

A first effort can be found in a solution mining technique proposed in U.S. Pat. No. 2,388,009 to Pike. Pike discloses a method of producing soda ash from underground trona deposits in Wyoming by injecting a heated brine containing substantially more carbonate than bicarbonate which is unsaturated with respect to the trona, withdrawing the solution from the formation, removing organic matter from the solution with an adsorbent, separating the solution from the adsorbent, crystallizing, and recovering sodium sesquicarbonate from the solution, calcining the sesquicarbonate to produce soda ash, and re-injecting the mother liquor from the crystallizing step into the formation.

Another patent to Pike, U.S. Pat. No. 2,625,384, discloses another solution mining method which uses water as a solvent under ambient temperatures to extract trona from existing mined sections of the trona deposits. The subsequent solution is withdrawn from the mine and heated before dissolving additional dry mined trona in the solution to form a carbonate liquor having more concentrated values of sodium salts which can subsequently be processed into sodium carbonate.

However, the solution mining process for a sodium (bi) carbonate-containing ore is not as simple as is the case with solution-mining of single-salt ores such as to recover sodium chloride or potassium chloride because of the complex solubility relationships in the ore containing sodium sesquicarbonate (main component of trona) or wegscheiderite. A complicating factor in dissolving in situ these types of underground double-salt ores is that sodium carbonate and sodium bicarbonate have different solubilities and dissolving rates in water. These incongruent solubilities of sodium carbonate and sodium bicarbonate can cause sodium bicarbonate "blinding" (sometimes termed 'bicarb blinding') during solution mining.

Blinding occurs as the bicarbonate, which has dissolved in the mining solution tends to redeposit out of the solution onto the exposed face of the ore as the carbonate saturation in the solution increases, thus clogging the dissolving face and "blinding" its carbonate values from further dissolution and recovery. Blinding can thus slow dissolution and may result in leaving behind significant amounts of reserves in the mine.

It can be shown that the aforementioned problem arises because when trona, for example, is dissolved in water, both the sodium bicarbonate and the sodium carbonate fractions begin going into solution at the same time until the solution reaches saturation with respect to sodium bicarbonate. Unfortunately, the resulting liquid phase existing at this point is in equilibrium with sodium bicarbonate in solid phase, and the sodium carbonate continues to dissolve while the bicarbonate starts precipitating out until the final resulting solution is in equilibrium condition with sodium sesquicarbonate (trona) as the stable solid phase, in fact, reached wherein a substantial portion of sodium bicarbonate precipitates out of solution and a lot more of the sodium carbonate has gone into solution. Wegscheiderite behaves in much the same way as trona in that they both go into solution in accordance with their respective solid percentage compositions of sodium bicarbonate and sodium carbonate, however, more sodium carbonate wants to go into solution and, because of this, it causes part of the sodium bicarbonate to precipitate back out. The resulting equilibrium condition is one in which substantially more sodium carbonate and a good deal less sodium bicarbonate exists in the solution phase than was present in the original solid phase mineral composition.

It is this phenomenon of the unstable nature of both trona and Wegscheiderite in solution in the presence of the solid phase mineral that is responsible for the clogging problem. More specifically, the sodium bicarbonate that precipitates out does so upon the surrounding, thus producing a barrier that inhibits the solvent action of the water upon the more water-soluble sodium carbonate trapped and sealed underneath the re-deposited sodium bicarbonate. The net result of this phenomenon is to progressively change the effective composition of the formation upon which the aqueous solvent acts until it appears to be made up of sodium bicarbonate alone. In other words, as more and more of the sodium bicarbonate precipitates out, this deposit seals off the interstices through which the aqueous solvent can gain access to the sodium carbonate in the formation, thereby permitting the aqueous solvent to act upon successively smaller amounts of sodium carbonate until about all the aqueous solvent can reach is the sodium bicarbonate barrier itself. As previously stated, both of the naturally-occurring sodium (bi)carbonate-containing minerals (namely, wegscheiderite and trona) behave in the same way. Nahcolite, a mineral which contains mainly sodium bicarbonate, does not suffer from such phenomenon due to the fact that nahcolite is essentially free of sodium carbonate.

Therefore it is expected that long term solution mining of a sodium (bi)carbonate-containing mineral may produce brines with lower sodium carbonate values and higher sodium bicarbonate values than those seen initially. This requires that a process be capable of handling the changing brine grade or that incongruent dissolution must be avoided by some means.

"Bicarb blinding" is an occurrence which has been recognized as a problem pertaining to solution mining of trona. Methods to address such phenomenon are described, for example, in some U.S. patents. U.S. Pat. No. 3,184,287 to Gancy discloses a method for preventing incongruent dissolution and bicarbonate blinding in the mine by using an aqueous solution of an alkali, such as sodium hydroxide having a pH greater than sodium carbonate, as a solvent for solution mining. In US '287, the aqueous sodium hydroxide solvent used in trona solution mining is regenerated by causticization of aqueous sodium carbonate with lime.

U.S. Pat. No. 3,953,073 to Kube and U.S. Pat. No. 4,401,635 to Frint also disclose solution mining methods using a solvent containing sodium hydroxide. US '073 describes the use of aqueous sodium hydroxide for solution mining of trona and nahcolite, and of other $NaHCO_3$-containing ores, and discloses that the solvent requirements may be met either by causticization of soda ash with hydrated lime or by the electrolytic conversion of sodium chloride to sodium hydroxide.

U.S. Pat. No. 4,652,054 to Copenhafer et al. discloses a solution mining process of a subterranean trona ore deposit with electrodialytically-prepared aqueous sodium hydroxide in a three zone cell in which soda ash is recovered from the withdrawn mining solution.

U.S. Pat. No. 4,498,706 to Ilardi et al. discloses the use of electrodialysis unit co-products, hydrogen chloride and sodium hydroxide, as separate aqueous solvents in an integrated solution mining process for recovering soda ash. The electrodialytically-produced aqueous sodium hydroxide is utilized as the primary solution mining solvent and the co-produced aqueous hydrogen chloride is used to solution-mine NaCl-contaminated ore deposits to recover a brine feed for the electrodialysis unit operation.

These patents are hereby incorporated by reference for their teachings concerning solution mining with an aqueous solution of an alkali, such as sodium hydroxide and concerning the making of a sodium hydroxide-containing aqueous solvent via electrodialysis.

Unfortunately, to avoid incongruent dissolution, alkalis such as sodium hydroxide or lime need to be used constantly during solution mining, and because of their high costs, such constant use adversely affects the economics of such solution mining processes.

The present invention thus provides a remedy to some of the problems associated with 'bicarb blinding' during solution mining of trona and/or wegscheiderite.

Although this foregoing 'bicarb blinding' issue has been and will be described in terms of trona and/or wegscheiderite mining, it may also apply to solution mining of any double-salt ore with incongruent solubilities.

SUMMARY

The present invention relates to a method for recovering alkali values from at least one cavity of an underground ore formation, said ore comprising a double-salt of sodium carbonate and sodium bicarbonate (such as trona or wegscheiderite), such method for the recovery of alkali values comprising: dissolution of the incongruent double-salt from a free ore face during a dissolution phase, while addressing the solubility inhibiting effect of sodium bicarbonate deposition onto the dissolving ore face due to the potential clogging of such face which would limit or prevent further ore dissolution. The present method includes a cavity cleaning phase in which the deposited sodium bicarbonate is dissolved and partly or completely converted to sodium carbonate in an aqueous solvent. The present method also comprises removing a liquor obtained from each of these phases from the underground formation to the surface, where the liquor is generally further processed to recover alkali values, such as soda ash, sodium bicarbonate, sodium sulfite, and/or other derivatives which may be obtained from a sodium carbonate-containing solution.

The first aspect of the present invention pertains to a solution mining method. A particular embodiment of this first aspect of the invention relates to a method for recovering alkali values from at least one cavity of an underground ore formation, said ore comprising trona and/or wegscheiderite, said method comprising:

carrying out an ore dissolution phase (a) into at least one cavity, said ore dissolution phase (a) comprising dissolving in situ at least a portion of ore from an ore face of the cavity into a first aqueous solvent to form a first liquor comprising sodium carbonate and to further deposit sodium bicarbonate (which precipitates) on at least a portion of the ore face;

carrying out a cavity cleaning phase (b) into the same cavity where the ore dissolution phase (a) takes place in order for at least a portion of said deposited sodium bicarbonate to be removed from the ore face, said cleaning phase (b) comprising dissolving in situ at least a portion of the deposited sodium bicarbonate and optionally dissolving in situ at least a portion of the ore from the ore face into a second aqueous solvent to form a second liquor comprising sodium carbonate, said second aqueous solvent having a parameter, preferably a surface parameter, selected from the group consisting of pH, hydroxide concentration, temperature, and any combinations thereof, which has a higher value than that of the first aqueous solvent used in the dissolution phase (a); and repeating the ore dissolution phase (a).

The parameter of said second aqueous solvent is preferably selected to be effective in converting at least some of the dissolved sodium bicarbonate to sodium carbonate in the second liquor.

The parameter of said second aqueous solvent may be further selected to be effective in preventing redeposition of sodium bicarbonate onto the dissolving ore face during the cavity cleaning phase (b).

According to an embodiment of the first aspect of the present invention, an injection well is used to inject the first solvent in the cavity during the ore dissolution phase (a), and the same injection well is used to inject the second solvent during the cavity cleaning phase (b); and at least one production well (different than the injection well) is used to withdraw the first liquor to the ground surface during the ore dissolution phase (a), and the same production well is used to withdraw the second liquor to the ground surface during the cavity cleaning phase (b).

According to a particular embodiment of the first aspect of the present invention, the method comprises: during the ore dissolution phase (a), the first solvent is injected into a cavity via a well, while the first liquor is withdrawn to the ground surface from another well; and during the cavity cleaning phase (b), the second solvent is injected into the same cavity via the same well which is used to withdrawn the first liquor, while the second liquor is withdrawn to the ground surface from the same well which is used to inject the first solvent.

According to some particular embodiments of the first aspect of the present invention, in an underground ore formation wherein the ore comprises trona and/or wegscheiderite, a method for recovering alkali values from a plurality of cavities in said ore formation may comprise: carrying out the dissolution phase (a) of the solution mining method according to the present invention in a first subset of cavities from said plurality to obtain, from each cavity of the first subset, a first liquor comprising sodium carbonate and sodium bicarbonate, while at the same time carrying out the cleaning phase (b) of the solution mining method according to the present invention in a second subset of cavities from said plurality (the cavities of the second subset being different than the cavities of the first subset) to obtain, from each cavity of the second subset, a second liquor comprising sodium carbonate and sodium bicarbonate with a content in sodium bicarbonate lower than said first liquor(s).

The plurality of cavities may comprise from 2 to 100 or even more cavities, being independently exploited for recovering alkali values.

The first subset of cavities in which the ore dissolution phase (a) is carried out comprises at least one cavity; preferably comprises at least 66%, more preferably at least 80%, most preferably at least 90% of the total number of cavities in the plurality.

The second subset of cavities in which the cavity cleaning phase (b) is carried out comprises at least one cavity; preferably comprises at most 33%, more preferably at most 20%, most preferably at most 10% of the total number of cavities in the plurality.

A particularly preferred embodiment of this first aspect of the present invention relates a method for recovering alkali values from at least one cavity of an underground ore formation comprising an ore selected from the group consisting of trona and wegscheiderite, said method comprising:

carrying out an ore dissolution phase (a) into the at least one cavity, said ore dissolution phase (a) comprising dissolving in situ at least a portion of ore from an ore face of the cavity into a first aqueous solvent to form said a liquor comprising sodium carbonate and to deposit sodium bicarbonate on at least a portion of the ore face;

carrying out a cavity cleaning phase (b) into the same cavity where the dissolution phase (a) takes place in order for at least a portion of said deposited sodium bicarbonate to be removed from the ore face, said cleaning phase (a) comprising dissolving in situ at least a portion of the deposited sodium bicarbonate and optionally dissolving in situ at least a portion of the ore from the ore face into a second aqueous solvent to form a second liquor comprising sodium carbonate, said second aqueous solvent having a pH or hydroxide concentration which is higher than that of the first aqueous solvent used in the dissolution phase (a); and repeating the ore dissolution phase (a).

Such pH or hydroxide concentration of said second aqueous solvent is preferably selected to be effective in converting at least some of the dissolved sodium bicarbonate to sodium carbonate in the second liquor, and further to be effective in preventing redeposition of sodium bicarbonate onto the dissolving ore face during the cavity cleaning phase (b).

Another particular embodiment of the first aspect of the present invention relates a method for recovering alkali values from at least one cavity of an underground ore formation comprising an ore selected from the group consisting of trona and Wegscheiderite, said method comprising:

carrying out an ore dissolution phase (a) into the at least one cavity, said ore dissolution phase (a) comprising dissolving in situ at least a portion of ore from an ore face of the cavity into a first aqueous solvent to form said a liquor comprising sodium carbonate and to deposit sodium bicarbonate on at least a portion of the ore face;

carrying out a cavity cleaning phase (b) into the same cavity where the dissolution phase (a) takes place in order for at least a portion of said deposited sodium bicarbonate to be removed from the ore face, said cleaning phase (a) comprising dissolving in situ at least a portion of the deposited sodium bicarbonate and optionally dissolving in situ at least a portion of the ore from the ore face into a second aqueous solvent to form a second liquor comprising sodium carbonate, said second aqueous solvent having a higher temperature than the first aqueous solvent used in the dissolution phase (a); and repeating the ore dissolution phase (a).

The temperature of said second aqueous solvent is preferably selected to be effective in converting at least some of the dissolved sodium bicarbonate to sodium carbonate in the second liquor. The temperature of said second aqueous solvent may be further selected to be effective in preventing redeposition of sodium bicarbonate onto the dissolving ore face during the cavity cleaning phase (b).

A second aspect of the present invention relates to a manufacturing process for making one or more sodium-based products, such as sodium carbonate or a sodium carbonate derivative, this process comprising the method according to the first aspect of the present invention.

In a particular embodiment of the second aspect of the present invention, in an underground ore formation, wherein said ore comprises trona and/or wegscheiderite, such process comprises:

carrying out the method for recovering alkali values according to the first aspect of the present invention to obtain a liquor comprising sodium carbonate and/or sodium bicarbonate by dissolution of the ore face by the first or second solvent, said liquor comprising at least a portion of said first liquor obtained in phase (a), at least a portion of said second liquor obtained in phase (b), or any combinations of at least a portion of said first liquor and at least a portion of said second liquor;

passing at least a portion of said liquor through one or more units selected from the group consisting of a crystallizer, a reactor, and an electrodialysis unit, to form at least one sodium-based product; and recovering said at least one sodium-based product.

Such sodium-based product may comprise sodium carbonate or a sodium carbonate derivative; in particular may be selected from the group consisting of sodium sesquicarbonate, sodium carbonate monohydrate, sodium carbonate decahydrate, sodium carbonate heptahydrate, anhydrous sodium carbonate, sodium bicarbonate, sodium sulfite, sodium bisulfite, sodium hydroxide, and other derivatives.

Yet a third aspect of the present invention relates to a sodium-based product selected from the group consisting of sodium sesquicarbonate, sodium carbonate monohydrate, sodium carbonate decahydrate, sodium carbonate heptahydrate, anhydrous sodium carbonate, sodium bicarbonate, sodium sulfite, sodium bisulfite, sodium hydroxide, and other derivatives, said product being obtained by the manufacturing process according to the second aspect of the present invention.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other methods or processes for carrying out the same purposes of the present invention. It should also be realized by those skilled in the art that such equivalent methods or processes do not depart from the spirit and scope of the invention as set forth in the appended claims.

BRIEF DESCRIPTION OF THE DRAWINGS

For a detailed description of the preferred embodiments, reference will now be made to the accompanying drawings which are provided for example and not limitation, in which:

FIG. 2a illustrates a method according to a fifth embodiment of the present invention, which comprises several cycles of phases, each cycle comprising carrying out an ore dissolution phase (a) and a cavity cleaning phase (b) in which two selected parameters are adjusted at the same time (between values y1 and y1' and between y2 and y2');

FIG. 2b illustrates a method according to a sixth embodiment of the present invention, which comprises several cycles of phases, each cycle comprising carrying out a first ore dissolution phase (a), a first cavity cleaning phase (b), a second ore dissolution phase (a), and a second cavity cleaning phase (b'), in which a first selected parameter is adjusted between values y1 and y1' to initiate the first cleaning phase (b) and a second selected parameter is adjusted between y2 and y2' to initiate the second cleaning phase (b');

FIG. 2c illustrates a method according to a seventh embodiment of the present invention, which comprises several cycles of phases, each cycle comprising carrying out an ore dissolution phase (a), a first cavity cleaning phase (b), another ore dissolution phase (a), and a second cavity cleaning phase (b'), in which the solvent parameter is adjusted between values y and y' and between y and y'' (y'' being different than y'), FIG. 2c using a repetition (periodic use) of the embodiment illustrated in FIG. 1a;

On the figures, identical numbers correspond to similar references.

Figure 1A:
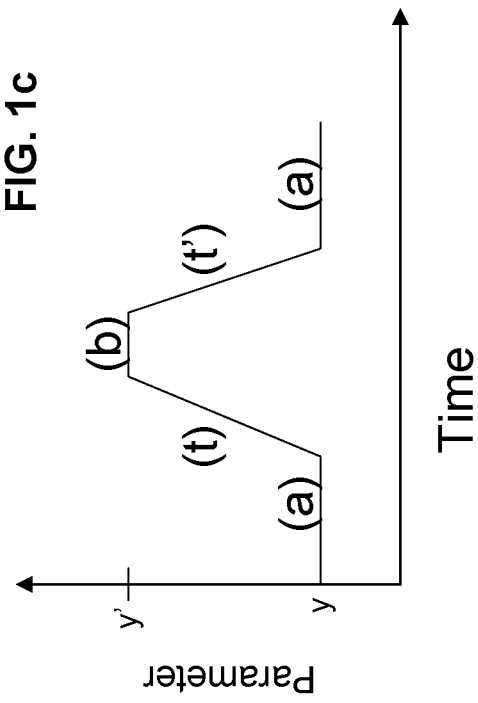
FIG. 1a illustrates a method according to a first embodiment of the present invention, in which there is a step adjustment in a selected parameter (from values y to y') between an ore dissolution phase (a) and a cavity cleaning phase (b)

Drawings have are not to scale or proportions. Some features may have been blown out or enhanced in size to illustrate them better.

Definitions

In the following description, a set of elements includes one or more elements.

A plurality of elements includes two or more elements.

Any reference to 'an' element is understood to encompass 'one or more' elements.

The term "solubility" refers to the water solubility of a compound in an aqueous solution.

The term "debicarbonating" refers to the action of decreasing the amount of bicarbonate of a stream.

The term "(bi)carbonate" refers to the presence of both sodium bicarbonate and sodium carbonate in a composition, whether being in solid form (such as trona) or being in liquid form (such as a liquor). For example, a (bi)carbonate-containing stream describes a stream which contains both sodium bicarbonate and sodium carbonate.

A parameter characterizing a solvent and/or liquor at the surface (e.g., before injection into the cavity) may be identified as a 'surface' parameter.

A parameter characterizing a solvent and/or liquor in the cavity may be identified as an 'in situ' parameter.

The term 'comprising' includes 'consisting essentially of' and also "consisting of".

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements and/or features of an apparatus, a process, or a method described herein can be combined in a variety of ways without departing from the scope and disclosures of the present teachings, whether explicit or implicit herein.

The use of the singular 'a' or 'one' herein includes the plural (and vice versa) unless specifically stated otherwise.

As used herein, the phrase 'A and/or B' for elements A and B refers to the following possible selections: element A; or element B; or combination of elements A and B (A+B).

The phrase 'A1, A2, . . . and/or An' for elements Ai (i=1 to n) with n≥3 refers to the following choices: any single element Ai (i=1, 2, . . . n); or any sub-combinations of from two to (n−1) elements chosen from A1, A2, . . . , An; or combination of all elements Ai (i=1, 2, . . . n). For example, the phrase 'A1, A2, and/or A3' refers to the following choices: A1; A2; A3; A1+A2; A1+A3; A2+A3; or A1+A2+A3. In addition, if the term "about" is used before a quantitative value, the present teachings also include the specific quantitative value itself, unless specifically stated otherwise. As used herein, the term "about" refers to a +−10% variation from the nominal value unless specifically stated otherwise.

DETAILED DESCRIPTION

The following detailed description illustrates embodiments of the present invention by way of example and not necessarily by way of limitation.

It should be noted that any feature described with respect to one aspect or one embodiment is interchangeable with another aspect or embodiment unless otherwise stated.

A first aspect of the present invention provides a solution mining method for recovering alkali values from a cavity of a subterranean ore formation containing both sodium carbonate and sodium bicarbonate, which employs at least two solution mining phases using aqueous solvents differing in at least one parameter selected from the group consisting of pH, hydroxide concentration, and temperature. One phase is preferably an ore dissolution phase (a) which comprises ore dissolution in the cavity upon contact of a free ore face in the cavity with a first aqueous solvent and which may further comprise depositing sodium bicarbonate onto some of the dissolving ore face. Another phase is preferably a cavity cleaning phase (b) which comprises the use of a second aqueous solvent so as to clean the ore face(s) which may be clogged by deposited sodium bicarbonate. It should be understood that the cavity cleaning phase (b) may also include dissolution of ore from at least a portion of the ore face which is in contact with the second aqueous solvent and which is not clogged and/or is no longer clogged by deposited sodium bicarbonate.

In preferred embodiments, there is a periodic use of the cavity cleaning phase (b) during solution mining.

Although the specific parameter(s) of interest (temperature, pH, and/or hydroxide concentration) in each of the (first and second) aqueous solvents used in these various phases may be measured in situ after the injection of the (first or second) solvent into the cavity and during its contact with the species to dissolve, such parameter is preferably measured at the surface before the (first or second) aqueous solvent is injected into the cavity. As such, a parameter which is measured at the surface may be identified as a 'surface' parameter.

The first and second aqueous solvents differ in at least one parameter, and such parameter of the second aqueous solvent is selected so as to be effective in converting at least some of the dissolved sodium bicarbonate to sodium carbonate in the second liquor. Such parameter of the second aqueous solvent may be also selected due to its effectiveness in preventing redeposition of sodium bicarbonate onto the dissolving ore face during the cavity cleaning phase (b).

Preferably, the (second) aqueous solvent used during the cavity cleaning phase (b) differs from the (first) aqueous solvent used in the ore dissolution phase (a) by having a higher hydroxide concentration, a higher pH, and/or a higher temperature.

More preferably, the second aqueous solvent used during the cavity cleaning phase (b) has a surface parameter of higher value than the first aqueous solvent used during the ore dissolution phase (a), such having a higher surface hydroxide concentration, a higher surface pH, and/or a higher surface temperature.

The duration of the cleaning phase (b) may be equal to or less than the duration of the ore dissolution phase (a), preferably less than the duration of phase (a).

The two phases (a) and (b) may be used in alternating mode. That is to say, there is one cycle of operation which consists of alternating an ore dissolution phase (a) and a cavity cleaning phase (b).

According to another aspect of a method for recovering alkali values from at least one cavity of an underground ore formation, whose ore comprises or consists of trona or Wegscheiderite, such method comprises:
  alternating between
    an ore dissolution phase (a) which is carried out into the at least one cavity and producing a first liquor; and
    a cavity cleaning phase (b) which is carried out into the same cavity where the dissolution phase (a) takes place and which produces a second liquor,
  both of said first and second liquors comprising sodium carbonate, at least a portion of each of said first and second liquors being withdrawn from the underground ore formation and being used to recover alkali values,
  wherein the ore dissolution phase (a) comprises: dissolving in situ at least a portion of ore from the ore face into a first aqueous solvent to form said first liquor comprising sodium carbonate and to deposit sodium bicarbonate on at least a portion of the ore face; and
  wherein the cavity cleaning phase (b) is carried out in order for at least a portion of said deposited sodium bicarbonate to be removed from the ore face, said cavity cleaning phase (b) comprising: dissolving in situ at least a portion of the deposited sodium bicarbonate and optionally dissolving in situ at least a portion of the ore from the ore face into a second aqueous solvent to form said second liquor, said second aqueous solvent having a higher pH, a higher hydroxide concentration, and/or a higher temperature than the first aqueous solvent used in the dissolution phase (a);
  the pH, the hydroxide concentration, and/or temperature of said second aqueous solvent being effective to convert at least some of the dissolved sodium bicarbonate to sodium carbonate in the second liquor; and
  the pH, the hydroxide concentration, and/or the temperature of said second aqueous solvent further being effective in preventing redeposition of sodium bicarbonate onto the dissolving ore face.

The pH, the hydroxide concentration, and/or the temperature of said second aqueous solvent are preferably 'surface' parameters.

In some embodiments, the second aqueous solvent comprises at least a portion of the first aqueous solvent used in the dissolution phase (a).

In some embodiments, the second aqueous solvent is formed ex situ by adding steam, a hot stream, and/or a base to at least a portion of said first aqueous solvent which is used in the dissolution phase (a), before the so-formed second aqueous solvent is injected into the cavity for the cleaning phase (b) to be initiated.

In some embodiments, the second aqueous solvent is formed ex situ by adding a solution containing sodium hydroxide and/or calcium hydroxide solution to at least a portion of said first aqueous solvent which is used in the dissolution phase (a), before the so-formed second aqueous solvent is injected into the cavity for the cleaning phase (b) to be initiated.

In some embodiments, the second aqueous solvent is formed ex situ by passing at least a portion of the first or second liquor withdrawn from the cavity through at least one electrodialysis unit to generate a sodium hydroxide-containing solution, said sodium hydroxide-containing solution providing at least a portion of said second aqueous solvent.

In some embodiments, the method further comprises recycling at least a portion of the first liquor withdrawn from the ore cavity to be included in the first aqueous solvent during the dissolution phase (a); and/or further comprises recycling at least a portion of the second liquor withdrawn from the ore cavity to be included in the second aqueous solvent during the cavity cleaning phase (b).

In some embodiments, the parameter value of the second aqueous solvent which is higher than that of the parameter of the first aqueous solvent is selected so as to maintain the sodium bicarbonate concentration in the second liquor below 8% by weight, preferably below 5% by weight, more preferably below 3.5% by weight, even more preferably below 2% by weight, and even more preferably below 1% by weight.

For example, when the parameter is the pH and the pH value in the second aqueous solvent is higher than in the first aqueous solvent, the pH value in the second aqueous solvent is selected so as to maintain the sodium bicarbonate concentration in the second liquor below 8% by weight, preferably below 5% by weight, more preferably below 3.5% by weight, even more preferably below 2% by weight, and even more preferably below 1% by weight. A suitable range of sodium bicarbonate concentration in the second liquor may be from 0.1 wt % to 8 wt %, preferably between 2 wt % and 8 wt %.

In some embodiments, the first and second aqueous solvents both comprise sodium carbonate at a concentration below the sodium carbonate saturation level under the operating conditions used in their respective phases (a) and (b).

In some embodiments, the second liquor comprises sodium bicarbonate at a concentration below the sodium bicarbonate saturation level.

In some embodiments, the first aqueous solvent comprises a Total Alkali content of from 0 to 12%, and wherein the second aqueous solvent comprises a Total Alkali content of from 0 to 8%.

In some embodiments, the second aqueous solvent comprises a base selected from the group consisting of sodium hydroxide, potassium hydroxide, calcium hydroxide, ammonium hydroxide, magnesium hydroxide, and any combinations of two or more thereof. In such instance, the first aqueous solvent may also include such base albeit at a much lower concentration than the second solvent or may exclude such base.

In particular embodiments, the second aqueous solvent may comprise sodium hydroxide at a concentration from 0.5 to 10% by weight, preferably from 3 to 6% by weight. In such instance, the first aqueous solvent may also include sodium hydroxide with a lower NaOH concentration than the second solvent, for example from 0.1 to 3% NaOH by weight; or the first aqueous solvent may not contain sodium hydroxide.

In some embodiments, the ore dissolution phase (a) is carried out for a first period of time; and the cavity cleaning phase (b) is carried out for a second period of time which is equal to or preferably shorter than the first period of time. For example, the first period of time for the ore dissolution phase (a) may be from 6 to 15 days; while the second period of time for the cavity cleaning phase (b) may be from 1 to 3 days. In some instances, the ratio of the first period of time for the ore dissolution phase (a) to the second period of time for the cavity cleaning phase (b) is from 2 to 15, preferably from 5 to 10.

In some embodiments, the second aqueous solvent may have a higher flow rate than the first aqueous solvent.

In some embodiments when the second aqueous solvent has a pH and/or a hydroxide concentration (preferably surface pH, surface hydroxide concentration) higher than the first aqueous solvent used in the dissolution phase (a), such pH or hydroxide concentration of the second aqueous solvent is effective in converting at least some of the dissolved sodium bicarbonate to sodium carbonate in the second liquor, and is further effective in preventing redeposition of sodium bicarbonate onto the dissolving ore face during the cavity cleaning phase (b).

In additional or alternate embodiments, the second aqueous solvent has a higher surface temperature than the first aqueous solvent.

Various preferred embodiments according to the present invention will now be described in reference to the drawings. The parameter described in relation to these drawings refers to a solvent parameter selected from the group consisting of pH, hydroxide content, and temperature. The parameter is preferably a solvent surface parameter selected from the group consisting of surface pH, surface hydroxide content, and surface temperature.

FIG. 1a illustrates such aspect of the method according to the present invention, in which there is a step adjustment in the selected parameter value (from baseline value y to adjusted value y') after an ore dissolution phase (a) and before a cavity cleaning phase (b) and another step adjustment in the selected parameter value (from y' back to baseline value y) after the cavity cleaning phase (b) and before another ore dissolution phase (a). This cycle of phases (a)-(b)—may be repeated during the present method. In preferred embodiments, there is a periodic use of the cavity cleaning phase (b) during solution mining. Such periodic use is illustrated for example in FIG. 2a, FIG. 2b and FIG. 2c.

In other embodiments (not illustrated), the cleaning phase (b) may be used once during the present solution mining method.

Another embodiment of the present invention relates to a solution mining method which comprises an ore dissolution phase (a) and a cleaning phase (b) and which further comprises one or more transition phases (t), (t') carried out in between the ore dissolution phase (a) and the cleaning phase (b). The ore dissolution phase (a) and the cleaning phase (b) generally differ in using at least one specific parameter selected from the group consisting of pH, hydroxide concentration, and temperature (preferably the cleaning phase having a higher pH, and/or a higher hydroxide concentration, and/or a higher temperature). When a transition phase (t) and/or (t') is used, its duration is preferably equal to or less than that of the cavity cleaning phase (b). Such embodiment of the method may be illustrated for example by FIGS. 1b and 1c.

Figure 1C:
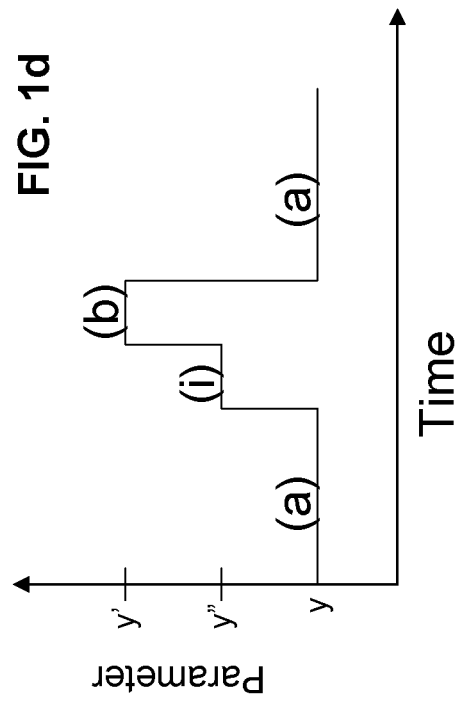
FIG. 1c illustrates a method according to a third embodiment of the present invention, in which there is a gradual increase in a selected parameter (from values y to y') during a transition phase (t) carried out after one ore dissolution phase (a) and before a cavity cleaning phase (b), and in which there is a gradual decrease in the selected parameter during another transition phase (t') carried out after the cavity cleaning phase (b) and before the subsequent ore dissolution phase (a)
Figure 1B:
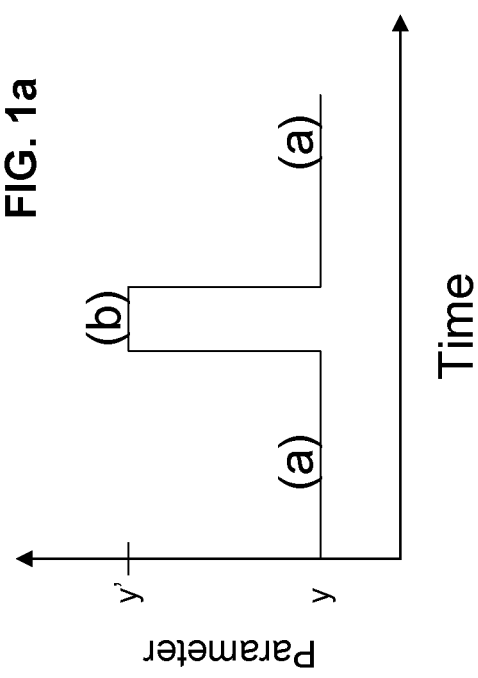
FIG. 1b illustrates a method according to a second embodiment of the present invention, in which there is a gradual adjustment (from values y to y') in a selected parameter during a transition phase (t) carried out after one ore dissolution phase (a) and before a cavity cleaning phase (b), and in which there is a sudden drop in value for the selected parameter at the end of the cavity cleaning phase (b) to initiate the next ore dissolution phase (a)

In FIG. 1b, there is a transition phase (t) carried out after one ore dissolution phase (a) and before a cavity cleaning phase (b); there is a gradual increase in the selected parameter value (from value y to value y') during the transition phase (t) carried out after the first ore dissolution phase (a) and before the cavity cleaning phase (b) and there is a sudden drop in value (from y' to y) for the selected parameter at the end of the cavity cleaning phase (b) to initiate the next ore dissolution phase (a). This cycle of phases (a)-(t)-(b)—may be repeated during the solution mining operation.

In FIG. 1c, there is a transition phase (t) carried out after one ore dissolution phase (a) and before a cavity cleaning phase (b) and another transition phase (t') carried out after the cavity cleaning phase (b) and before the subsequent ore dissolution phase (a). There is a gradual increase in the selected parameter (from value y to value y') during the transition phase (t), and there is a gradual decrease in the selected parameter (from value y' to value y) during another transition phase (t') carried out after the cavity cleaning phase (b) and before the subsequent ore dissolution phase (a). This cycle of phases (a)-(t)-(b)-(t')—may be repeated during the solution mining operation.

The transition phase (t) may allow for the specific selected solvent parameter to be adjusted from an initial value (y)—sometimes also called baseline value—used in the ore dissolution phase (a) to a desired higher value (y') to be used in the cavity cleaning phase (b). The transition phase (t') may allow for the specific parameter to be adjusted from the higher solvent parameter value (y') used in the cavity cleaning phase (b) to its initial lower value (y)—as shown—or another value less than y' to be used in the dissolution phase (a). This parameter adjustment (preferably increase in its value) may be step-wise or may be gradual employing a sudden change or a gradual change from y to y' or vice versa. For example, the transition phase (t) may include increasing the value of the hydroxide concentration or the pH in the first aqueous solvent used in ore dissolution phase (a) from its initial value y to the desired value y' in the hydroxide concentration or pH of the second aqueous solvent used in the cavity cleaning phase (b), for example by adding an amount of a base (e.g., an alkali hydroxide) to the first aqueous solvent to achieve the desired value y' of pH or hydroxide concentration in the second aqueous solvent. For another example, the transition phase (t) may include increasing the temperature of the first aqueous solvent used in ore dissolution phase (a) form baseline value y to the desired value y' of solvent temperature used in the cavity cleaning phase (b), for example by adding an amount of steam or a hot stream to the first aqueous solvent to achieve the desired temperature value y' in the second aqueous solvent, wherein the hot stream is a stream with a higher temperature (preferably a higher surface temperature) than the first aqueous solvent.

In preferred embodiments, there is a periodic use of one or more transition phases (t) and one or more cavity cleaning phases (b) during solution mining. Such periodic use is illustrated for example in FIG. 2d.

Yet another embodiment of the first aspect of the present invention provides for a solution mining method comprising more than two successive phases. A first phase may include an ore dissolution phase (a) and a last phase may include a cavity cleaning phase (b), while one or more intermediate phases (i) may be carried out between the first and last phases. The one or more intermediate phases (i) may use a solvent with a higher hydroxide concentration, and/or a higher pH, and/or a higher temperature than the solvent used in an immediately-preceding phase. In this embodiment of the first aspect of the present invention, when the last cleaning phase (b) is completed, the first phase (a) may be repeated, thereby establishing a cycle having a plurality of phases of solution mining in which an increasing value of at least one parameter selected from the group consisting of pH, hydroxide concentration, and temperature, preferably selected from the group consisting of surface temperature, surface pH, and surface hydroxide concentration is carried out. Such embodiment of the solution mining method may be illustrated for example by FIG. 1d.

Figure 1D:
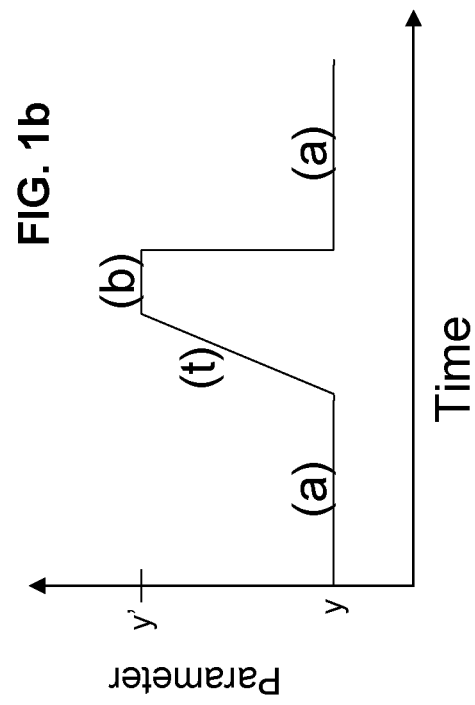
FIG. 1d illustrates a method according to a fourth embodiment of the present invention, in which there is a step increase in a selected parameter (from values y to y'') carried out after one ore dissolution phase (a) and before an intermediate phase (t''), and in which there is yet another step increase in the selected parameter (from values y'' to y') carried out after the intermediate phase (t'') and before a cavity cleaning phase (b), followed by a sudden drop in parameter value (from y' to y) to initiate a subsequent ore dissolution phase (a)

In FIG. 1d, there is an intermediate phase (i) carried out after an ore dissolution phase (a) and before a cavity cleaning phase (b). There is a step increase in the selected parameter (from values y to y") to initiate the intermediate phase (i), and there is yet another step increase in the selected parameter (from values y" to y') carried out after the intermediate phase (i) and before the cavity cleaning phase (b), followed by a sudden decrease in the parameter value (from y' to y) to initiate another ore dissolution phase (a). This cycle (a)-(i)-(b)—may be repeated during the solution mining operation.

Yet another embodiment of the first aspect of the present invention provides for a cyclic solution mining method comprising an ore dissolution phase (a) and a cavity cleaning phase (b), in which two different parameters may be adjusted so that both of their values are higher during the cavity cleaning phase (b) than during the ore dissolution phase (a).

FIG. 2a illustrates such embodiment of the first aspect according to the present invention. There is an ore dissolution phase (a) characterized by a first parameter (with baseline value of y1) such as solvent temperature and a second parameter (with baseline value of y2), such as solvent pH and/or hydroxide content, and to initiate the cavity cleaning phase (b), there is a concurrent step increase in the values of the first and second parameters from y1 to y1' and from y2 to y2', respectively. This cycle (a)-(b)—is repeated during the solution mining operation. Although FIG. 2a illustrates a simultaneous step adjustment for both first and second parameters, any of the parameter adjustment techniques according to FIG. 1a to 1d may be applied in this embodiment according to the first aspect of the present invention for either of, or both of, the first and second parameters in the cavity cleaning phase (b).

An alternate embodiment according to the first aspect of the present invention provides for a cyclic solution mining method comprising an ore dissolution phase (a) and at least two types of cavity cleaning phases (b) and (b'), in which a first parameter may be adjusted (preferably from a baseline value to a higher value) during a first cavity cleaning phase (b), and a second parameter (same or different than the first parameter) may be adjusted (preferably to a higher value) during a second cavity cleaning phase (b'). That is to say, the adjustments in the first and second parameters are generally not concurrent, but may be used in rotation over time.

FIG. 2b illustrates such embodiment of the solution mining method according to the present invention. There is an ore dissolution phase (a) characterized by a first parameter (value of y1) and a second parameter (value of y2), followed by a step increase in the value of the first parameter from y1 to y1' to initiate the first cavity cleaning phase (b) maintained for a certain period (p1). There is a step decrease in the value of the first parameter from y1' to y1 to repeat the ore dissolution phase (a) which is followed by a step increase in the value of the second parameter from y2 to y2' to initiate the second cavity cleaning phase (b') maintained for a certain period (p2), wherein the period (p2) may be different than the period (p1) in phase (b) as shown in FIG. 2b or may be the same. There is a step decrease in the value of the second parameter from y2' to y2 to carry out yet another ore dissolution phase (a). This cycle (a)-(b)-(a)-(b')—may be repeated during the solution mining operation. Although FIG. 2b illustrates staggered step adjustment for the first and second parameters, any of the parameter adjustment techniques according to FIG. 1a to 1d may be applied in this aspect of the present invention for the first parameter in cleaning phase (b) and for the second parameter for cleaning phase (b').

In a particular embodiment, the cyclic solution mining method comprises an ore dissolution phase (a) and at least two cavity cleaning phases (b) and (b'), in which the solvent parameter is adjusted (preferably its baseline value is increased to a higher value) to initiate and carry out a first cavity cleaning phase (b), and the same parameter is adjusted (preferably its same baseline value is increased to yet another high value) to initiate and carry out a second cavity cleaning phase (b'). That is to say, these two adjustments in the solvent parameter are not concurrent, and differ in the increased values at which these cleaning phases (b) and (b') operate.

Figure 2C:
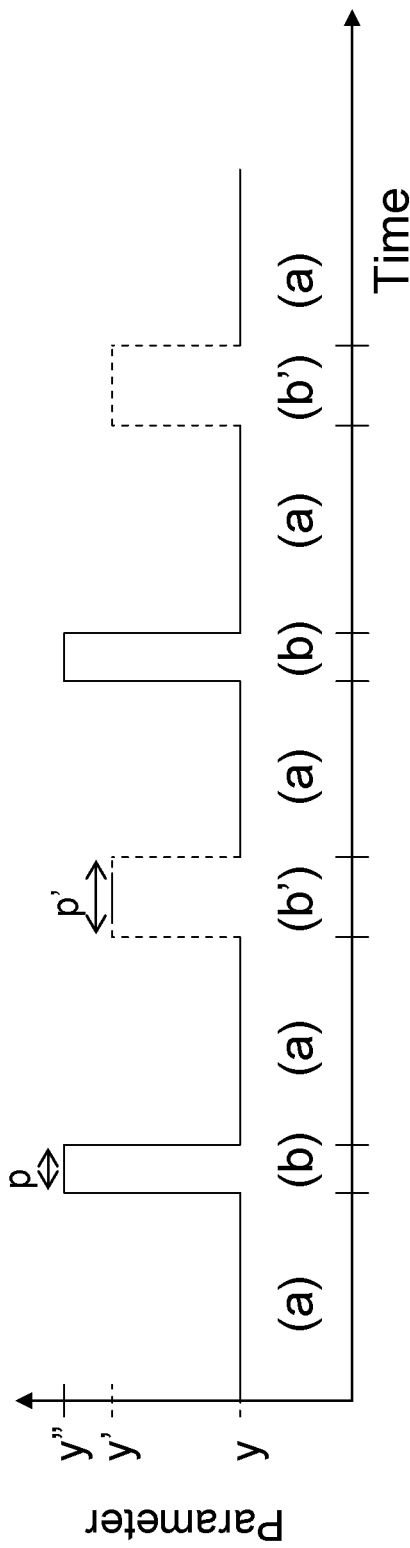
Figure 2D:
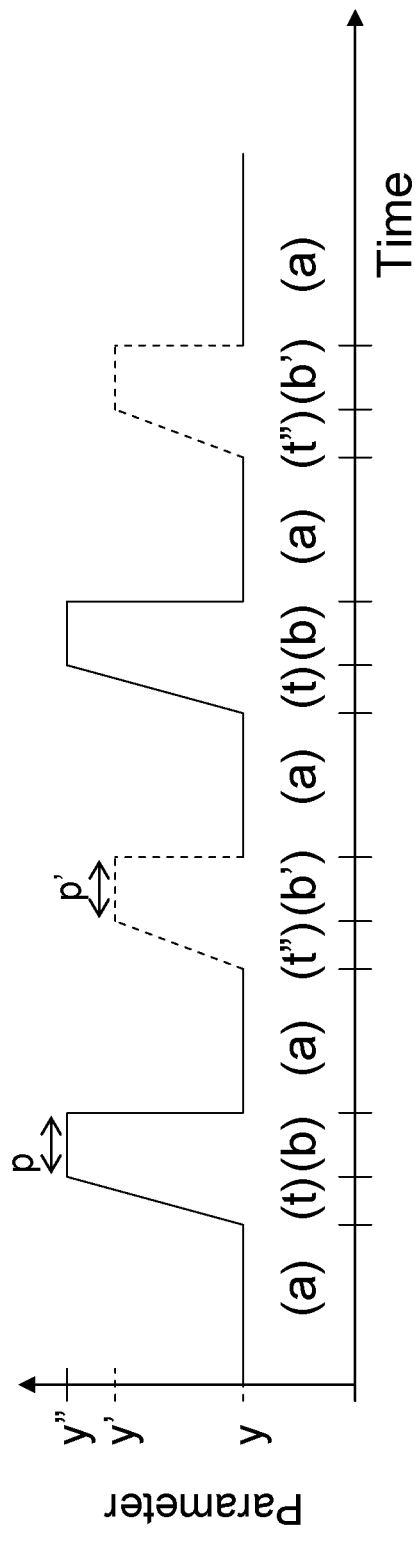
FIG. 2d illustrates a method according to an eighth embodiment of the present invention, which comprises several cycles of phases, each cycle comprising carrying out an ore dissolution phase (a), a transition phase (t), a first cavity cleaning phase (b), another ore dissolution phase (a), another transition phase (t''), and a second cavity cleaning phase (b'), in which the solvent parameter is adjusted between values y and y' and between y and y'' (y'' being different than y'), FIG. 2d using a repetition (periodic use) of the embodiment illustrated in FIG. 1b.

FIGS. 2c and 2d illustrate such embodiment of the solution mining method according to the present invention. There is an ore dissolution phase (a) characterized by a solvent parameter (baseline value of y), which is increased to a higher value (y") and maintained at y" for a certain period (p) to carry out the first cavity cleaning phase (b). The increase in solvent parameter to start the cleaning phase (b) may be a step increase (as shown in FIG. 2c) or a gradual increase via a transition phase (t) as shown in FIG. 2d. The value of the solvent parameter is then decreased from y" again to baseline y, e.g., by a step decrease as shown in FIGS. 2c and 2d or a gradual decrease via another transition phase—not shown, to repeat the ore dissolution phase (a) which is followed by another increase in the solvent parameter value from baseline y to y' (y' being different than y") to carry out the second cavity cleaning phase (b') which is maintained for a certain period (p'), wherein the time period (p') for phase (b') may be different than the time period (p) for phase (b) as shown in FIG. 2c or be the same as shown in FIG. 2d. The solvent parameter increase to start phase (b') may be a step increase (FIG. 2c) or a gradual increase via a transition phase (t") as shown in FIG. 2d. There is again a decrease in the value of the solvent parameter from y' to y to carry out yet another ore dissolution phase (a). The cycle (a)-(b)-(a)-(b')—shown in FIG. 2c or the cycle (a)-(t)-(b)-(a)-(t")-(b')—shown in FIG. 2d or combinations thereof may be repeated during the solution mining operation.

In preferred embodiments, the ore comprises a double-salt, such as comprising sodium carbonate and sodium bicarbonate. The ore to be solution mined preferably comprises at least one evaporite mineral selected from the group consisting of trona and wegscheiderite. Trona ore is a mineral that may contain up to 99%, generally from 70 to 99% sodium sesquicarbonate ($Na_2CO_3 \cdot NaHCO_3 \cdot 2H_2O$). The ore more preferably comprises $Na_2CO_3 \cdot NaHCO_3 \cdot 2H_2O$ (sodium sesquicarbonate) and/or $Na_2CO_3 \cdot 3NaHCO_3$ (wegscheiderite).

A particular embodiment of the present invention provides a solution mining method for recovering sodium values from trona. However, it should be understood that any following or foregoing embodiments which are described in terms of trona mining are equally applicable to the mining of other non-combustible ore which contains a double-salt (such as wegscheiderite), unless otherwise stated.

In preferred embodiments, the dissolution phase (a) and the cavity cleaning phase (b) use aqueous solvents differing in at least one parameter (preferably a surface parameter) selected from the group consisting of pH, hydroxide concentration, and temperature.

In some embodiments, the in situ parameter of the second solvent and/or liquor is such so as to maintain the sodium bicarbonate concentration in the second liquor below 8% by weight, preferably below 5% by weight, more preferably below 3.5% by weight, even more preferably below 2% by weight, and even more preferably below 1% by weight.

In preferred embodiments of the present invention, the second aqueous solvent used in a cavity cleaning phase (b) may have a pH and/or hydroxide concentration higher than that of the first aqueous solvent used in the dissolution phase (a). The pH and/or hydroxide concentration are preferably the 'surface' parameters.

The surface pH of the first and second aqueous solvents may be the same or different at the time of injection for the dissolution and cleaning phases.

If the surface pH of the first and second aqueous solvents differ at the time of injection, preferably the surface pH of the second aqueous solvent at the time of injection during the cavity cleaning phase (b) may be higher than the surface pH of the first aqueous solvent which is injected during the ore dissolution phase (a).

The surface pH of the first aqueous solvent may be at least 8.4, preferably at least 8.5. The surface pH of the first aqueous solvent may be as high as a value of 10. A pH range of from 8.4 to 9.6 may be suitable for the first aqueous solvent. A pH range of from 8.4 to 9.6 may be suitable for the first aqueous solvent.

The surface pH of the second aqueous solvent may be at least 8.9, preferably at least 9.0, or at least 9.2, or at least 9.5, or at least 10. The surface pH of the second aqueous solvent may be as high as a value of 12. A pH range of from 10 to 11.5 may be suitable for the second aqueous solvent.

If the surface pH of the first and second aqueous solvents differ at the time of injection, preferably the surface pH of the second aqueous solvent at the time of injection during the cavity cleaning phase (b) may be greater than the surface pH of the first aqueous solvent which is injected during the ore dissolution phase (a). For example, the surface pH of the second aqueous solvent at the time of injection during the cavity cleaning phase (b) may be at least 0.5 pH unit greater, preferably at least 0.75 pH unit greater than the surface pH of the first aqueous solvent which is injected during the ore dissolution phase (a).

In some embodiments, the in situ pH of the second solvent and/or liquor is higher than the in situ pH of the first solvent and/or liquor so as to maintain the sodium bicarbonate concentration in the second liquor below 8% by weight, preferably below 5% by weight, more preferably below 3.5% by weight, even more preferably below 2% by weight, and even more preferably below 1% by weight. The sodium bicarbonate concentration in the first liquor is generally above 3.5% by weight, preferably above 5% by weight, and may even be above 8% by weight.

In preferred embodiments, the second aqueous solvent may also comprise a base selected from the group consisting of sodium hydroxide, potassium hydroxide, calcium hydroxide, ammonium hydroxide, magnesium hydroxide, and any combinations of two or more thereof.

The second aqueous solvent preferably comprises sodium hydroxide. The concentration of NaOH in the second aqueous solvent may be from 0.5 to 10% NaOH by weight, preferably from 3 to 6% NaOH by weight, more preferably from 3.5 to 5.5% NaOH by weight, most preferably from 4.5 to 5.5% NaOH by weight.

When the second aqueous solvent contains sodium hydroxide and/or calcium hydroxide, at least a part of this sodium hydroxide and/or calcium hydroxide used in the method may be derived from one of the alkali values recovered from either or both of the first and second liquors generated from the dissolution phase (a) and the cavity cleaning phase (b), respectively.

As a non-limiting example, electrodialysis may be used as a means to obtain a sodium hydroxide solution, so that the second aqueous solvent comprising sodium hydroxide which can be used in the cleaning phase (b) may comprise this sodium hydroxide solution or a portion thereof. At least a portion of the liquor produced during the dissolution phase (a) and/or even during the cleaning phase (b) may be passed through one or more electrodialysis units before recycling such portion into the cavity. The electrodialysis operation allows the formation of sodium hydroxide from this sodium carbonate-containing solution. Suitable electrodialysis techniques and suitable membranes to use in an electrodialysis unit may be found in U.S. Pat. No. 6,924,318 to Mischi et al, U.S. Pat. No. 5,888,368 to Posar, US 2010/0284891 and US 2010/0282614, both to Detournay et al, each incorporated herein by reference in the present application.

Preferably, the first aqueous solvent may exclude the same base (e.g., alkali compound) that is used in the second solvent during the cavity cleaning phase (b). The first solvent preferably does not contain sodium hydroxide, or calcium hydroxide. Alternatively, the first aqueous solvent may include the same base (e.g., alkali compound) albeit at a much lower concentration than the second aqueous solvent. If the first solvent contains a hydroxide compound, such as sodium hydroxide or calcium hydroxide, the first solvent preferably contains less than 1%, preferably less than 0.5%, of hydroxide by weight.

The surface temperature of the first and second aqueous solvents may be the same or different at the time of injection for the dissolution and cleaning phases.

If the surface temperature of the first and second aqueous solvents differ at the time of injection, preferably the surface temperature of the second aqueous solvent at the time of injection during the cavity cleaning phase (b) may be at least 3° C. higher, or at least 5° C. higher, or at least 8° C. higher, or even at least 10° C. higher, or even at least 15° C. higher than the surface temperature of the first aqueous solvent which is injected during the ore dissolution phase (a).

The surface temperatures of the injected first and/or second aqueous solvents can vary from ambient surface temperature to 250° F. (121° C.), preferably up to 220° F. (104° C.). The surface temperature of the first and/or second aqueous solvents may be between 0° F. and 200° F. (from −17.7° C. to 104° C.), preferably greater than 32° F. and up to 200° F. (>0° C. to 104° C.). A first solvent with a temperature between 100 and 220° F. (37.8-104° C.), or between 104 and 176° F. (40-80° C.), or between 140 and 176° F. (60-80° C.), or between 100 and 150° F. (37.8-65.6° C.), or between 60 and 90° F. (15.6-32.2° C.) may be used. For example, when the surface temperature for the first solvent may be between 100 and 150° F. (37.8-65.6° C.), the surface temperature for the second solvent is at least 3° C. higher than the surface temperature of the first solvent and may be between 140 and 176° F. (60-80° C.). The higher the surface temperature of the solvent, the higher the rate of in situ dissolution of water-soluble ore components (e.g., desired sodium (bi)carbonate).

In preferred embodiments, the surface temperature for the first solvent may be between 37.8 and 65.6° C. or more preferably between 40 and 60° C., while the surface temperature for the second solvent is at least 3° C. higher than the surface temperature of the first solvent and may be between 60 and 80° C., or more preferably between 70 and 80° C., most preferably between 70 and 75° C.

The liquor which is removed to the surface has a surface temperature generally lower than the surface temperature of the aqueous solvent at the time of injection into the cavity. The surface temperature in the resulting extracted liquor may be at least 3° C. lower, or at least 5° C. lower, or at least 8° C. lower, or even at least 10° C. lower, than the surface temperature of the injected solvent.

In additional or alternate embodiments, the second liquor formed during the cavity cleaning phase (b) may have an in situ temperature equal to or higher than that of the first liquor formed during the ore dissolution phase (a).

The in situ temperature of the liquor formed during either phase may change from its point of injection by loss of heat to cooler surroundings as it gets exposed to underground ore. Additionally, ore dissolution is generally endothermic. Therefore the in situ temperature of the liquor formed during either phase will decrease as its residence time in the cavity increases. That is to say, the longer the liquor will stay in the cavity, the greater temperature decrease will be observed. The in situ temperature may eventually approach or match the temperature of the ore when the first and/or second liquor reaches the point from which it is extracted to the surface such as via a production well. Because the first liquor extracted from the mined area may be at saturation with respect to sodium carbonate and may have an equilibrated temperature with the underground ore, the level of saturation in the desired solute defined by such temperature may remain unchanged throughout the cavity enlargement and production, thus providing a liquor with a constant content in desired solute (e.g., sodium values). In that way, the liquor content in desire solute may not fluctuate over time during each of the dissolution and cleaning phases of the solution mining operation.

Generally however the flow rate for the solvent injected into the cavity in any phase is selected (high enough) so that the difference in surface temperature between the injected solvent and the withdrawn liquor is less than 20° C., preferably less than 15° C., more preferably less than 12° C. The difference in surface temperature between the injected solvent and the withdrawn liquor may be between 5° C. and 10° C.

In some embodiments, the dissolution phase (a) and the cavity cleaning phase (b) use aqueous solvents and/or liquors differing in two or more (surface or in situ) parameters selected from the group consisting of pH, hydroxide concentration, and temperature. For example, the second aqueous solvent used in the cleaning phase (b) may have a higher surface pH and/or hydroxide concentration as well as a higher surface temperature than the first aqueous solvent used in the dissolution phase (a).

In some embodiments, the second aqueous solvent may comprise at least a portion of the first aqueous solvent used in the dissolution phase (a).

In preferred embodiments, the second aqueous solvent may be formed ex situ (that is to say, not in the cavity) by adding to at least a portion of the first aqueous solvent which is used in the dissolution phase (a) the following: a base, a hot stream (with a temperature, preferably a surface temperature, higher than that of said first aqueous solvent), and/or steam, before the so-formed second aqueous solvent is injected into the cavity for the cleaning phase (b) to be initiated or carried out.

In more preferred embodiments, the second aqueous solvent is formed ex situ by adding a solution or slurry or suspension containing sodium hydroxide and/or calcium hydroxide to at least a portion of said first aqueous solvent which is used in the dissolution phase (a), before the so-formed second aqueous solvent is injected into the cavity for the cleaning phase (b) to be initiated or carried out.

In alternate or additional embodiments, the second aqueous solvent may be formed ex situ by passing at least a portion of the first aqueous solvent used in the dissolution phase (a) through a heat exchanger to adjust (preferably increase) the surface temperature, before the so-formed second aqueous solvent is injected into the cavity for the cleaning phase (b) to be initiated or carried out.

The passage through the heat exchanger may be carried out prior to or after an addition of the base.

To make the second solvent, the addition of a stream (comprising or consisting of steam, a base, and/or a hot stream (e.g., hot water stream or hot sodium-carbonate-containing solution) to at least a portion of the first aqueous solvent may be done simultaneously and at the same location, or may be done at different locations. For example, the base and/or the hot stream may be added ex situ while steam may be added in situ.

In yet alternate or additional embodiments, the second aqueous solvent may be formed ex situ by adding a base, a hot stream (e.g., hot water stream and/or a hot sodium-carbonate-containing solution with a temperature, preferably a surface temperature, higher than the first aqueous solvent), and/or steam to at least a portion of the first aqueous solvent used in the dissolution phase (a) and further passing through a heat exchanger to adjust (preferably increase) the surface temperature, before the so-formed second aqueous solvent is injected into the cavity for the cleaning phase (b) to be initiated. The passage through the heat exchanger may be carried out prior to or after the addition of the base and/or steam.

In particular embodiments, the second aqueous solvent may be formed ex situ by passing at least a portion of the first and/or second liquor withdrawn from the ore cavity through at least one electrodialysis unit to generate a sodium hydroxide-containing solution, said sodium hydroxide-containing solution providing at least a portion of said second aqueous solvent.

The electrodialysis unit may contain at least two types of compartments and two types of membranes, cationic and bipolar. A bipolar membrane is an ion exchange membrane comprising one cationic face—permeable for the cations and impermeable for the anions and an other anionic face—permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. In some embodiments, the electrodialysis unit may contain additional types of compartments and anionic membranes. Suitable embodiments concerning production of a solution containing NaOH from one or more $Na_2CO_3$-containing solutions via an electrodialysis unit may be found in U.S. Pat. No. 5,888,368 to Posar, US 2010/0284891 and US 2010/0282614, both to Detournay et al.

In particular embodiments, the electrodialysis unit may comprise alternating less basic and more basic adjacent compartments separated from each other by cationic membranes, the more basic compartments being delimited by the anionic faces of bipolar membranes on one side and by the cationic membranes on the other side. In such embodiment, the method may further comprise the following steps:

introducing at least a portion of a liquor comprising sodium carbonate into less basic compartments of the electrodialysis unit comprising alternating less basic and more basic adjacent compartments separated from each other by cationic membranes, the more basic compartments being delimited by the anionic faces of bipolar membranes on one side and by the cationic membranes on the other side;

introducing at least another portion of the same liquor or a portion of another liquor comprising sodium carbonate into the more basic compartments of the electrodialysis unit;

producing a solution comprising sodium hydroxide into the more basic compartments, by combination of the flux of sodium ions crossing the cationic membrane and the flux of hydroxyl ions crossing the anionic face of the bipolar membranes; and extracting a solution comprising sodium hydroxide from the more basic compartments of the electrodialysis unit, a portion of it or all of it providing the second aqueous solvent or a portion thereof.

During the cleaning phase (b), the second aqueous solvent which comprises such sodium hydroxide solution extracted from the electrodialysis unit is put into contact in the cavity with precipitated sodium bicarbonate and optionally into contact with a solvent-exposed face (unclogged) of the ore comprising sodium bicarbonate in order to debicarbonate the liquor by converting in situ some of or all of the sodium bicarbonate to sodium carbonate.

In some alternate albeit less preferred embodiments, the second aqueous solvent may be formed in situ by separately injecting into the cavity steam, a hot stream (with a temperature, preferably a surface temperature, higher than the first aqueous solvent, e.g., water stream or a hot sodium-carbonate-containing solution), and/or a base (e.g., a solution/suspension/slurry containing sodium hydroxide and/or calcium hydroxide solution) at the same time as injecting at least a portion of the first aqueous solvent used in the dissolution phase (a) into the cavity.

In any or all of the embodiments of the in situ method according to the present invention, either or both of the first and second aqueous solvents may comprise water or an aqueous solution comprising a desired solute. The desired solute may be selected from the group consisting of sodium sesquicarbonate, sodium carbonate, sodium bicarbonate, and mixtures thereof.

The first and/or second aqueous solvent employed in such method may contain or may consist essentially of water or an aqueous solution unsaturated in desired solute. The water in the first and/or second aqueous solvent may originate from natural sources of fresh water, such as from rivers or lakes, or may be a treated water, such as a water stream exiting a wastewater treatment facility.

In some embodiments, the first and second aqueous solvents may comprise sodium carbonate at a concentration below the sodium carbonate saturation level under the operating conditions used in their respective phases (a) and (b).

In some embodiments, the first liquor may comprise an unsaturated sodium carbonate solution under the operating conditions used in the ore dissolution phase (a).

In some embodiments, the second liquor may comprise an unsaturated sodium carbonate solution under the operating conditions used in the cleaning phase (b). Under certain operating conditions for example when temperature and/or the pH is quite high in the second solvent, the second liquor may approach sodium carbonate saturation.

In some embodiments, the first liquor may comprise an unsaturated sodium bicarbonate concentration.

In preferred embodiments, the second liquor may comprise sodium bicarbonate at a concentration below the sodium bicarbonate saturation level.

In some embodiments, the first and/or second aqueous solvents may have a concentration below about 10 percent by weight $NaHCO_3$, a concentration below about 5 percent by weight NaCl, a concentration below about 1 percent by weight $Na_2SO_4$, and a concentration from about 0.5 to 15 percent by weight $Na_2CO_3$.

In some embodiments, the first aqueous solvent may comprise a Total Alkali (TA) content of from 0 to 12%, preferably from 0 to 8%, and/or the second aqueous solvent may comprise a Total Alkali (TA) content of from 0 to 8%, preferably from 0 to 4%.

The first aqueous solvent and the second aqueous solvent may have a sodium carbonate content of from 1 to 8 wt %, preferably from 2 to 6 wt %, more preferably from 3 to 5 wt %.

In some embodiments, the first liquor and/or the second liquor comprises a Total Alkali content of from 5 to 25%, or from 6 to 20%, or from 8 to 18%, or from 8 to 16%.

The first liquor and the second liquor may have a sodium carbonate content of from 5 to 20 wt %, preferably from 7 to 18 wt %, more preferably from 9 to 15 wt %. The second liquor generally has a higher sodium carbonate content that the first liquor.

In additional or alternate embodiments according to the present invention, when both first and second aqueous solvents are injected into the cavity during each phase and differ in at least pH and/or hydroxide concentration, the second aqueous solvent may further have a higher surface temperature at the time of its injection than the first aqueous solvent. The surface temperature of the second aqueous solvent may be at least 5° C., preferably 10° C. higher, more preferably 15° C. higher than the temperature of the first aqueous solvent.

The ore dissolution phase (a) is carried out for a first period of time; and the cavity cleaning phase (b) is carried out for a second period of time which is equal to or less than the first period of time. The first period of time (duration) for the ore dissolution phase (a) may be from 6 to 15 days; and the second period of time (duration) for the cavity cleaning phase (b) may be from 1 to 3 days. When there is a periodic use of the cavity cleaning phase (b) during solution mining, the second period of time may be the same for each cavity cleaning phase (b), but not necessarily. This time period would depend at least in part on the difference in values of the selected solvent parameter between the previous dissolution phase (a) and the subsequent cleaning phase (b) which would impact the effectiveness of and/or rate of cleaning.

Additionally or alternatively, the ratio of the first period of time for the ore dissolution phase (a) to the second period of time for the cavity cleaning phase (b) may be from 2 to 15, preferably from 5 to 10.

During the ore dissolution phase (a), the deposited sodium bicarbonate may form a layer of a thickness of up to 10 cm, preferably a thickness from 0.5 to 10 cm, more preferably a thickness from 2 to 10 cm.

The flow rate of the first and second aqueous solvents may be the same or different at the time of injection for the dissolution and cleaning phases.

In some embodiments, the flow rate of the second aqueous solvent may be equal to or greater than the flow rate of the first aqueous solvent.

If the flow rates of the first and second aqueous solvents differ at the time of injection, the flow rate of the second aqueous solvent at the time of injection during the cavity cleaning phase (b) may be greater than the flow rate of the first aqueous solvent which is injected during the ore dissolution phase (a). The flow rate of the second aqueous solvent at the time of injection may be at least 5 $m^3$/hr greater, at least 10 $m^3$/hr greater, or at least 20 $m^3$/hr greater, or at least 30 $m^3$/hr greater, or even at least 50 $m^3$/hr greater than the flow rate of the first aqueous solvent.

The first solvent flow rate for each injection well may vary from 11 to 228 cubic meters per hour ($m^3$/hr) [from 50 to 1,000 gallons per minute]; or from 13 to 114 $m^3$/hr (from 60 to 500 gpm); or from 16 to 45 $m^3$/hr (from 70 to 200 gpm); or from 20 to 30 $m^3$/hr (from 88 to 133 gpm); or from 20 to 25 $m^3$/hr (from 88 to 110 gpm); or from 25 to 30 $m^3$/hr (from 110 to 133 gpm).

The second solvent may have a flow rate of from 22 to 228 cubic meters per hour ($m^3$/hr) [from 100 to 1,000 gpm]; or from 45 to 228 $m^3$/hr (from 200 to 1,000 gpm), or from 22 to 114 cubic meters per hour ($m^3$/hr) [from 100 to 500 gpm]; or from 45 to 114 cubic meters per hour ($m^3$/hr) [from 200 to 500 gpm]. A flow rate of from 25 to 40 $m^3$/hr (from 110 to 176 gpm) may also be suitable.

In some embodiments, the method may comprise injecting the first aqueous solvent into the cavity to initiate the ore dissolution phase (a); and stopping injection of the first aqueous solvent into the cavity at the end of the ore dissolution phase (a) before carrying out injection of the second aqueous solvent into the cavity for the cleaning phase (b) to be initiated.

In some embodiments, the method may comprise injecting the first aqueous solvent into the cavity to initiate the ore dissolution phase (a); and injecting an additional stream (steam and/or alkaline solution) at the same time as the first aqueous solvent or into the first aqueous solvent at the end of the ore dissolution phase (a) to form the second solvent and to initiate the cleaning phase (b), the amount of the additional stream being effective in adjusting the specific parameter to a desired value.

Any of the dissolution phase (a), the cleaning phase (b), and/or any transition or intermediate phase (t) or (i) may be carried out under a pressure lower than hydrostatic head pressure, or be carried out at hydrostatic head pressure. The pressure may vary depending on the depth of the targeted ore. Any phase may be carried out under a pressure lower than hydrostatic head pressure (at the depth at which the cavity is formed) during the cavity formation and enlargement. Any phase may carried out at hydrostatic head pressure after the initial cavity is formed, for example during the dissolution phase in which the cavity is filled with liquid solvent. The operating pressure may be at least 0 psig (102 kPa), or at least 300 psig (2170 kPa), or at least 700 psig (5410 kPa). The pressure may be at most 4500 psig (31128 kPa), or at most 1200 psig (8375 kPa), or at most 1100 psig (7686 kPa). The pressure may range from 0 psig to 4500 psig (101-31128 kPa); or from 0 psig to 2000 psig (101-13890 kPa); or from 0 psig to 1200 psig (101-8375 kPa); or from 300 psig to 1200 psig (2170-8375 kPa); or even from 700 to 1100 psig (5410-7686 kPa).

The ore dissolution phase (a) of such method may comprise, in operative sequence at steady state conditions, the steps of: injecting the first aqueous solvent at a wellhead through an injection well into the cavity of the underground ore formation, for the first aqueous solvent to come in contact with at least a portion of the free ore face in the cavity so as to dissolve some ore into the first solvent to form the first liquor and to enlarge the cavity; maintaining said first liquor in said cavity at a temperature of below about 250° F. (below about 121° C.); circulating at least a portion of said first liquor in the cavity; and withdrawing at least another portion of said first liquor from said underground ore formation (via the same injection well or preferably via a different well called a 'production well'); and recovering an alkali value from said withdrawn portion of such first liquor. In preferred embodiments, the method may further comprise recycling at least a portion of the first liquor withdrawn from the ore cavity (and which is not used to recover alkali values) to be included in the first aqueous solvent during the dissolution phase (a).

The cavity cleaning phase (b) of such method may comprise, in operative sequence at steady state conditions, the steps of: injecting the second aqueous solvent at a wellhead through an injection well—which may be the same injection well used in dissolution phase (a) or may be the production well used in dissolution phase (a) or yet another well altogether—into the same cavity in which the ore dissolution phase (a) was carried out, for the second aqueous solvent to come in contact with deposited sodium bicarbonate so as to dissolve at least some of the deposited sodium bicarbonate into the second solvent and optionally (albeit preferably also) to come in contact with at least a portion of the free ore face in the cavity so as to additionally dissolve some ore into the second solvent to form a second liquor; maintaining said second liquor in the cavity at a temperature below about 250° F. (below about 121° C.); circulating at least a portion of said second liquor in the cavity; and withdrawing at least another portion of said second liquor from said underground ore formation (via the same injection well or preferably via a 'production well' which may have been the injection well used in the dissolution phase (a)); and recovering an alkali value from said withdrawn portion of such second liquor. In preferred embodiments, the method may further comprise recycling at least a portion of the second liquor withdrawn from the ore cavity (and which is not used to recover alkali values) to be included in the second aqueous solvent during the cavity cleaning phase (b).

Figure 4:
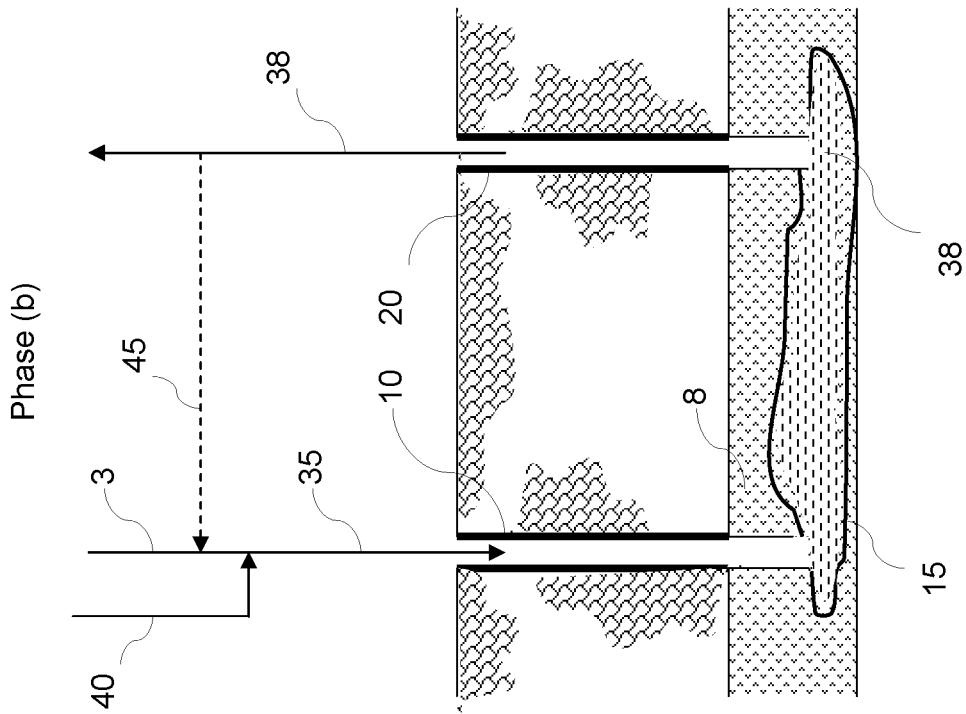
FIG. 4 is a simplified flow diagram which schematically illustrates the operation of a cavity cleaning phase (b) according to an embodiment of the present invention.
Figure 3:
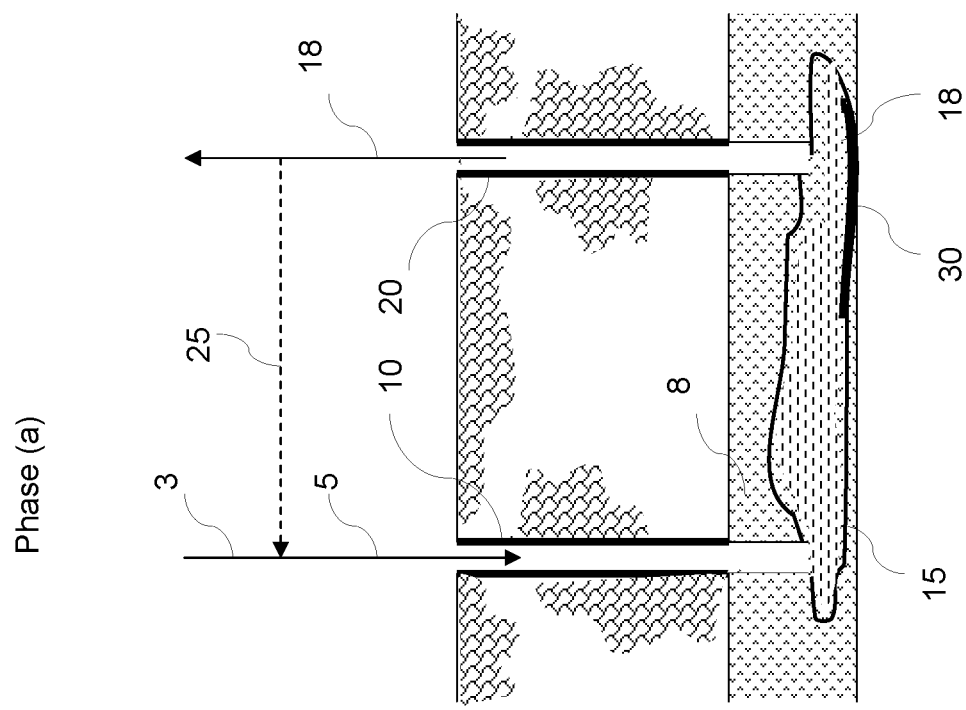
FIG. 3 is a simplified flow diagram which schematically illustrates the operation of an ore dissolution phase (a) according to a method of the present invention.
Figure 6:
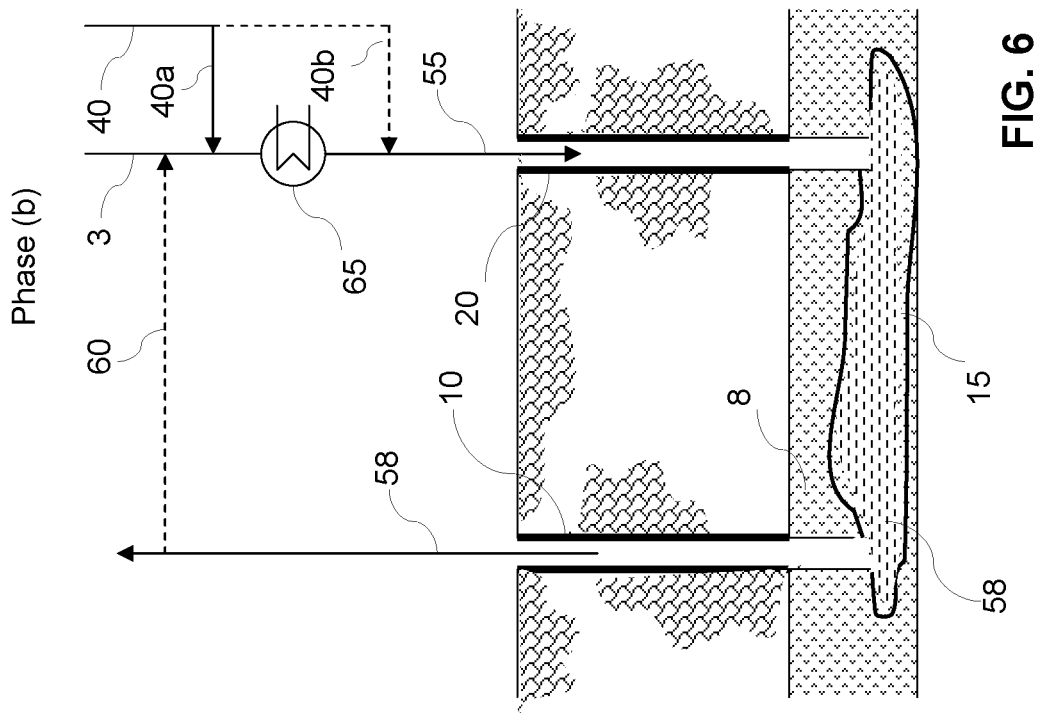
FIG. 6 is a simplified flow diagram which schematically illustrates the operation of a cavity cleaning phase (b) according to yet another embodiment of the present invention.
Figure 5:
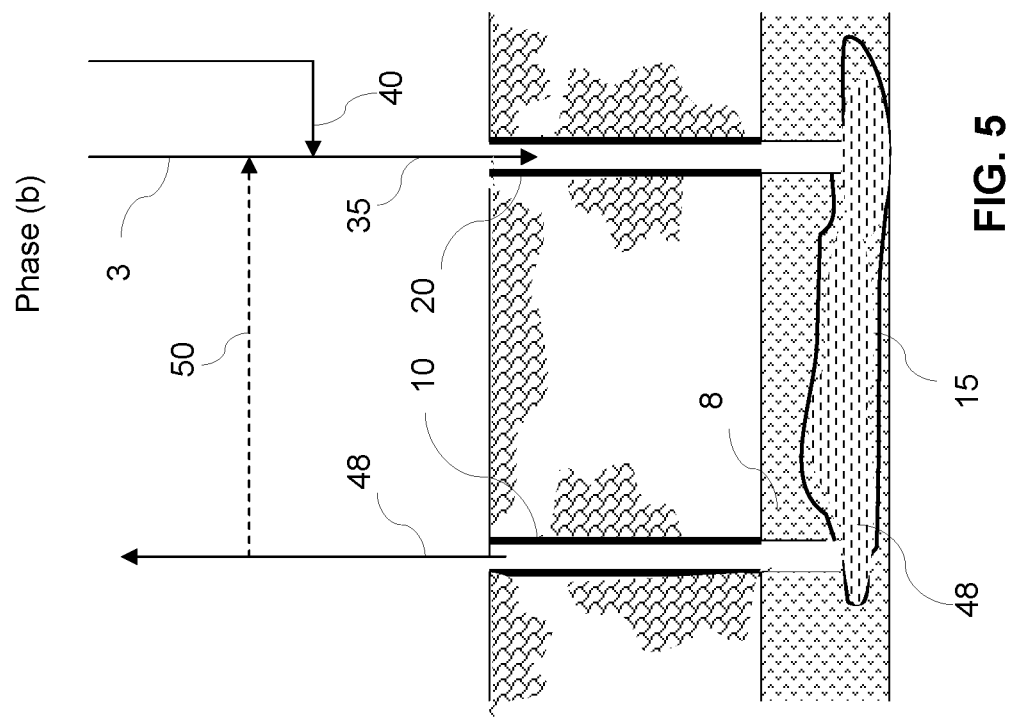
FIG. 5 is a simplified flow diagram which schematically illustrates the operation of a cavity cleaning phase (b) according to another embodiment of the present invention.

FIGS. 3 to 6 illustrate a two-well trona solution mining process, in which FIG. 3 represents an ore dissolution phase (a) and FIGS. 4-6 represent various embodiments of a cavity cleaning phase (b).

FIG. 3 illustrates the operation of a dissolution phase (a) for trona ore during a solution mining process. A first aqueous solvent 5 is injected into a well 10 to come into contact with ore within a cavity 15 formed into a trona bed 8 for dissolution of at least a portion of its water-soluble components: 'desired solutes' such as sodium carbonate, sodium bicarbonate, and 'undesirable solutes' such as water-soluble impurities (like sodium chloride, sodium sulfate, water-soluble organics) into the first aqueous solvent and to form a (first) liquor 18 which is recovered to the surface via a well 20. The first aqueous solvent 5 may comprise at least a portion 25 of the first liquor 18 extracted to the surface which is recycled for re-injection into the cavity 15 in order for it to get enriched in desired solutes. This allows for a gradual increase in concentration of the desired solutes into the liquor 18. As the liquor may reach or even exceed the sodium bicarbonate solubility limit at the temperature of operation during in situ dissolution phase (a), some of the sodium bicarbonate 30 may precipitate on top of at least a portion of the ore face of the cavity 15 once it reaches this saturation level in the liquor.

Figure 7:
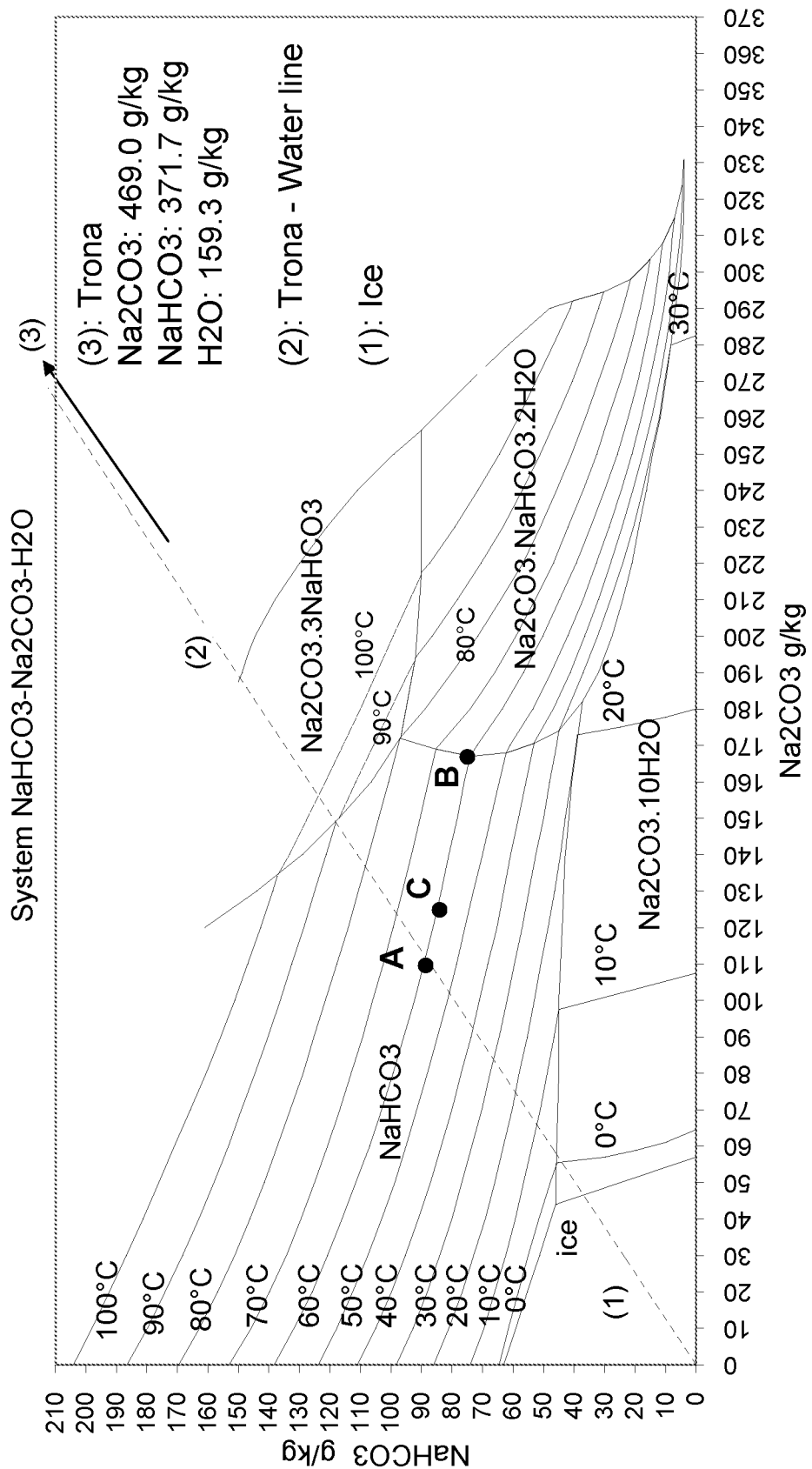
FIG. 7 is a solubility diagram of sodium carbonate—sodium bicarbonate in water.

For example, water dissolving trona at 60° C. in the sodium bicarbonate solid phase region in the solubility diagram in FIG. 7 follows the trona-water line (2) towards the trona composition point (3)—not shown in FIG. 7 and would become sodium bicarbonate saturated at Point A. As trona dissolution continues thereafter, this causes the solution chemistry to move along the constant 60° C. temperature line (isotherm) toward the trona solid phase region until the solution would become double saturated at Point B and trona dissolution would stop there, as both the soda ash related ions and sodium bicarbonate related ions would be at saturation with trona in the solid phase. However, before dissolution reaches this Point B, the rate of trona dissolution is slowed down from progressive ore face clogging due to sodium bicarbonate precipitation, and trona dissolution would stop prematurely for example at Point C and not reach the double saturation Point B on the 60° C. isotherm.

The deposited sodium bicarbonate may form a layer of a thickness up to 10 cm, preferably of a thickness from 0.5 to 10 cm, more preferably of a thickness from 2 to 10 cm. Since the first liquor 18 gets enriched with more and more sodium bicarbonate as it flows towards the well 20 (which is used to extract it to the surface, also called 'production' well), the precipitated sodium bicarbonate 30 may get deposited more predominantly near the well 20. The first aqueous solvent 5 may further comprise a make-up aqueous stream 3 which is generally unsaturated in sodium bicarbonate and sodium carbonate.

FIG. 4 illustrates the operation of a cavity cleaning phase (b) during a solution mining process. A second aqueous solvent 35 is injected into the same injection well 10 which was used during the ore dissolution phase (a) as described in relation to FIG. 3, to come into contact with ore in the same cavity 15 formed within the trona bed 8 for dissolution of at least a portion of the deposited sodium bicarbonate 30 and optionally also some of the ore water-soluble components into the second aqueous solvent and to form a second liquor 38 which is recovered to the surface via the same production well 20.

The first and second aqueous solvents (5 in FIG. 3, 35 in FIG. 4) may both comprise sodium carbonate at a concentration below the sodium carbonate saturation level under the operating conditions used in their respective phases (a) and (b).

The second aqueous solvent 35 may comprise at least a portion of the first aqueous solvent 5 used in the dissolution phase (a) shown in FIG. 3. That is to say, the second aqueous solvent 35 may comprise a make-up aqueous stream 3 which is generally unsaturated in sodium bicarbonate and sodium carbonate. The second aqueous solvent 35 may also comprise at least a portion 45 of the liquor 38 which is extracted to the surface and which is recycled for re-injection into the cavity 15 in order for the liquor 38 to get enriched in desired solutes. This allows for gradual increase of the desired solutes concentration into the liquor 38. At the same time, because the change in the parameter (pH, hydroxide concentration, and/or temperature) of the second solvent 35 is effective in converting at least some of the dissolved sodium bicarbonate to sodium carbonate, the cleaning phase (b) includes in situ debicarbonating the liquor 18 for its sodium bicarbonate content to decrease. The debicarbonation of the liquor 18 should be effective so that the liquor 18 has a sodium bicarbonate concentration below 8% by weight, preferably below 5% by weight, more preferably below 3.5% by weight, even more preferably below 2% by weight, and even more preferably below 1% by weight.

The second aqueous solvent 35 may be formed ex situ (that is to say, not in the cavity 15) by adding an additional stream 40 to at least a portion of the first aqueous solvent 5 which was used in the dissolution phase (a). The so-formed second aqueous solvent 35 is injected via well 10 into the cavity for the cavity cleaning phase (b) to be initiated. The additional stream 40 is preferably used to adjust a specific parameter to a desired value to carry out the cavity cleaning phase (b). The additional stream 40 may comprise or consist of steam, and/or one or more hot streams (e.g., hot water stream; a hot sodium carbonate-containing stream with a surface temperature higher than that of the first aqueous solvent 5 used during the in situ dissolution phase (a)), and/or one or more bases (e.g., alkali compound) in solid form, in suspension form, in slurry form, or otherwise dissolved in an aqueous medium.

Although not illustrated in FIG. 4, the second aqueous solvent 35 may be formed in situ (that is to say, in the cavity 15) by adding an additional stream 40 (steam, hot water stream, one or more hot sodium carbonate-containing streams, and/or one or more bases) to at least a portion of the first aqueous solvent 5 which is used in the dissolution phase (a).

When the adjusted parameter is pH or hydroxide concentration, the additional stream 40 may comprise or may be an alkaline solution or suspension or slurry, and the second aqueous solvent 35 may be formed ex situ by adding such alkaline solution or suspension or slurry 40 to at least a portion of the first aqueous solvent 5 which was used in the dissolution phase (a). The so-formed second aqueous solvent 35 is injected into the cavity 15 for the cavity cleaning phase (b) to be initiated.

The additional stream 40 is used to adjust a specific parameter to a value in the second aqueous solvent 35 which is effective in dissolving some of (or preferably all of) the deposited sodium bicarbonate 30. The additional stream 40 may comprise a base, such as an alkali compound. A suitable base may be selected from the group consisting of sodium hydroxide, potassium hydroxide, calcium hydroxide, ammonium hydroxide, magnesium hydroxide, and any combinations of two or more thereof. Preferably, the additional stream 40 comprises a base which is not included in the first aqueous solvent 5 which is injected into the cavity 15 during the ore dissolution phase (a). For example, the additional stream 40 may be added for the surface pH of the second aqueous solvent 35 to be higher than the surface pH of the first aqueous solvent 5 used in the ore dissolution phase (a). A sodium hydroxide solution or a calcium hydroxide solution/slurry used as the additional stream 40 may be effective in adjusting the hydroxide concentration, so that the surface content in NaOH or $Ca(OH)_2$ of the second aqueous solvent 35 is higher than the surface content in NaOH or $Ca(OH)_2$ of the first aqueous solvent 5 used in the ore dissolution phase (a).

The second aqueous solvent 35 preferably comprises sodium hydroxide. The concentration of NaOH in the second aqueous solvent may be from 0.5 to 10% NaOH by weight, preferably from 3 to 6% NaOH by weight, more preferably from 4.5 to 5.5% NaOH by weight. The sodium hydroxide used in the second aqueous solvent 35 may be derived from one of the alkali values recovered from the first liquor 18 generated from ore dissolution phase (a) and/or from the second liquor 38 generated from cavity cleaning phase (b). For example, sodium hydroxide may be generated by passing at least a portion of the first liquor 18 generated from ore dissolution phase (a) and/or at least a portion of the second liquor 38 generated from cavity cleaning phase (b) through one or more electrodialysis units.

The addition of stream 40 (such as comprising or consisting of steam, hot water stream, one or more hot sodium carbonate-containing streams, and/or a base in solution, suspension or slurry form) preferably results in maintaining the sodium bicarbonate concentration in the second liquor 38 below 8% by weight, preferably below 5% by weight, more preferably below 3.5% by weight, even more preferably below 2% by weight, and even more preferably below 1% by weight.

FIG. 5 illustrates the operation of a cavity cleaning phase (b) during a solution mining process very similar to the one described in relation to FIG. 4, except that the second aqueous solvent 35 is injected into the well 20 which was used as a production well during the ore dissolution phase (a) described in relation to FIG. 3, to come into contact with ore in the same cavity 15 formed within the trona bed 8 for dissolution of at least a portion of the deposited sodium bicarbonate 30 and optionally also some of the ore water-soluble components into the second aqueous solvent. The second liquor 48 formed within cavity 15 is withdrawn to the surface via the well 10 which was used as an injection well during the ore dissolution phase (a) described in relation to FIG. 3.

In this embodiment, the switching of the well 20 from production to injection and of the well 10 from injection to production is advantageous for the second solvent is to be injected in proximity to the deposited bicarbonate 30. Indeed as shown in FIG. 3, the deposited sodium bicarbonate 30 is most likely prevalent around a downhole end of the well 20 which was the production well during dissolution phase (a), when the sodium bicarbonate content in the liquor surrounding the downhole end of this well may be saturated or supersaturated under the conditions of dissolution in this area of the cavity 15. As such, injection of the second solvent in this area targets quicker dissolution of deposited sodium bicarbonate 30.

FIG. 6 illustrates the operation of a cavity cleaning phase (b) during a solution mining process similar to the one described in relation to FIG. 5, in that a second aqueous solvent 55 is injected into the well 20 which was used as a production well during the ore dissolution phase (a) described in relation to FIG. 3, except that there is an adjustment of two parameters by two different means (e.g., addition of one or more streams and passing through one or more heat exchangers) before the second aqueous solvent 55 is injected into the cavity 15. The second aqueous solvent 55 comes into contact with ore in the same cavity 15 formed within the trona bed 8 for dissolution of at least a portion of the deposited sodium bicarbonate 30 and optionally also some of the ore water-soluble components into the second aqueous solvent and to form a second liquor 58 which is withdrawn to the surface via the well 10 which was used as an injection well during the ore dissolution phase (a) described in relation to FIG. 3. The second aqueous solvent 55 may comprise at least a portion of the first aqueous solvent 5 used in the dissolution phase (a) shown in FIG. 3. That is to say, the second aqueous solvent 55 may comprise a make-up aqueous stream 3 which is generally unsaturated in sodium bicarbonate and sodium carbonate. The second aqueous solvent 55 may also comprise at least a portion 60 of the liquor 58 which is extracted to the surface and which is recycled for re-injection into the cavity 15 in order for the liquor 58 to get enriched in desired solutes. This allows for gradual increase of the desired solutes concentration into the liquor 58.

The second aqueous solvent 55 may be formed ex situ (that is to say, not in the cavity 15) by adding an additional stream 40 to at least a portion of the first aqueous solvent 5 which was used in the dissolution phase (a). The additional stream 40 is preferably used to adjust a specific parameter to a desired value to initiate and carry out the cavity cleaning phase (b). The additional stream 40 may comprise steam, a hot stream, and/or a base. In this embodiment, the additional stream 40 preferably contains one or more bases in solid form, in suspension form, in slurry form or otherwise dissolved in an aqueous medium to adjust the pH and/or hydroxide content to a desired value.

The additional stream 40 may be added prior to passing the solvent through a heat exchanger 65 (see stream 40a) in which the surface temperature of the resulting second solvent (comprising make-up solution 3, recycled liquor 60, and part 40a of or all of additional stream 40) is increased so that the surface temperature of the second solvent is higher than the surface temperature of the first solvent 5 used in the ore dissolution phase (a).

Alternatively, the combined stream comprising or consisting of recycled liquor 60 and make-up solution 3 is passed through the heat exchanger 65 prior to the addition of a part 40b of or all of additional stream 40, so that the surface temperature of the formed second solvent 55 is higher than the surface temperature of the first solvent 5 used in the ore dissolution phase (a).

It is to be noted that the method according to the present invention is not limited to a two-well solution mining method as described in the context of FIGS. 3 to 6, but rather it may be implemented in a single-well solution mining process or in a solution mining method which may have more than two wells per cavity.

FIGS. 3 to 6 make reference to the cavity 15. Such cavity in the underground ore formation is preferably created prior to the onset of the ore dissolution phase (a).

The cavity may be created by hydrofracturing the underground ore formation for establishing fluid communication between an injection well and a production well; maintaining sufficient hydraulic pressure in such formation for propping open fractures; and circulating a solvent liquid through such fractures for dissolving water-soluble constituents of the ore to create such cavity. The injection well and the production well may be vertical, but not necessarily. The wells may be spaced by a distance of at least 50 meters, or at least 100 meters, or at least 200 meters. The wells may be spaced by a distance of at most 1000 meters, or at most 800 meters, or at most 600 meters. Preferred spacing may be from 100 to 600 meters, preferably from 100 to 500 meters.

The cavity may be created by drilling a directionally-drilled well (comprising a cased vertical portion—not in contact with ore- and an uncased horizontal portion—in contact with ore-) and also drilling a vertical well, a cased portion of which is not in contact with ore. The downhole end of the vertical well preferably intersects the uncased horizontal portion to provide fluid communication between the two wells. Injecting an aqueous solvent liquid through one well is carried out to bring the solvent liquid to come in contact with ore in said horizontal portion so as to dissolve water-soluble ore components and to create such cavity.

The cavity may be created by using a combination of such techniques. Suitable examples of such cavity creation may be found in U.S. Pat. No. 4,398,769 by Jacoby (hydrofracturing), in U.S. Pat. No. 7,611,208 by Day et al (solution mining with multiple horizontal boreholes), and in U.S. Pat. Application Publication No. 2011/0127825 by Hughes et al (undercut solution mining with horizontal boreholes). These patents/applications are hereby incorporated herein by reference for their teachings of such cavity creation and of solution mining of trona with an aqueous solution.

In some embodiment of the second aspect of the present invention, in order to recover alkali values such as at least one sodium-based product, the process may include feeding a liquor withdrawn from the cavity to at least one crystallization and/or reaction step to form a sodium-based product. The liquor may comprise at least a portion of the first liquor obtained in phase (a), at least a portion of the second liquor obtained in phase (b), or a combination of at least a portion of the first liquor obtained in phase (a) and at least a portion of the second liquor obtained in phase (b). The sodium-based product made by this process is preferably selected from the group consisting of: sodium carbonate monohydrate; sodium sesquicarbonate; anhydrous sodium carbonate crystallization; sodium carbonate decahydrate; sodium carbonate heptahydrate; sodium sulfite; and sodium bicarbonate.

The process may comprise at least one crystallization step selected from the group consisting of:
  passing at least a portion of the liquor comprising sodium carbonate which results from either of, or both of, the phases of operation through a sodium carbonate monohydrate crystallizer under crystallization promoting conditions to form sodium carbonate monohydrate crystals; or
  passing at least a portion of the liquor comprising sodium carbonate which results from either of, or both of, the phases of operation through a sodium sesquicarbonate crystallizer under crystallization promoting conditions to form sodium sesquicarbonate crystals;
  passing at least a portion of the liquor comprising sodium carbonate which results from either of, or both of, the phases of operation through a sodium carbonate crystallizer under crystallization promoting conditions to form anhydrous sodium carbonate crystals; or
  passing at least a portion of the liquor comprising sodium carbonate which results from either of, or both of, the phases of operation through a sodium carbonate hydrate crystallizer under crystallization promoting conditions to form crystals of sodium carbonate decahydrate or heptahydrate;
  passing at least a portion of the liquor comprising sodium carbonate which results from either of the phases of operation to a sodium sulfite plant where sodium carbonate is reacted with sulfur dioxide to form a sodium sulfite-containing stream and then passing a second crystallizer feed comprising at least a portion of said sodium sulfite-containing stream through a sodium sulfite crystallizer under crystallization promoting conditions suitable to form sodium sulfite crystals; and/or
  passing at least a portion of the liquor comprising sodium carbonate which results from either of, or both of, the phases of operation through a sodium bicarbonate crystallizer under crystallization promoting conditions comprising passing carbon dioxide to form sodium bicarbonate crystals.

In additional or alternate embodiments of the second aspect of the present invention, the process may further include passing the liquor or a part thereof comprising at least a portion of the first and/or second liquor through one or more electrodialysis units to form a sodium hydroxide-containing solution. This sodium hydroxide-containing solution may provide at least a part of the second solvent to be used during the cavity cleaning phase (b), when the pH and/or hydroxide content is increased from the baseline value in the phase (a).

In some embodiments, the process may further comprise pre-treating the liquor comprising a portion of at least one of the first and second liquors which comprises sodium bicarbonate and which is withdrawn from the underground formation and used to recover alkali values (that it to say, the withdrawn portion of the liquor not recycled into the cavity during either of the dissolution and cleaning phases), before manufacturing at least one sodium-based product. The pre-treating step may be carried out on at least a part of the liquor prior to being passed to a crystallizer and/or an electrodialysis unit.

In some embodiments, the process may further comprise pre-treating ex-situ at least a portion of a liquor comprising sodium bicarbonate which is withdrawn during either of, or both of, the dissolution and cleaning phases from the underground ore formation.

The pre-treating in this instance may convert some of the sodium bicarbonate to sodium carbonate to achieve a sodium bicarbonate concentration in the pretreated liquor below 3.5% by weight, preferably below 2% by weight, more preferably below 1% by weight, before being further subjected to a crystallization and/or reaction step (c) or before being recycled at least in part to the cavity. The pretreatment of the liquor may comprise contacting at least a portion of said liquor with steam, and/or the pretreatment of the liquor may comprise reacting the sodium bicarbonate in the liquor with sodium hydroxide or another base such as calcium hydroxide.

The pre-treating may additionally or alternatively include adjusting the temperature and/or pressure of at least a portion of the liquor before recovering alkali values therefrom and/or before recycling into the cavity.

In some embodiments of the second aspect of the present invention, the process may further comprise adding trona (such as solid virgin trona or calcined trona) to at least a portion of the first liquor and/or second liquor which is used to recover alkali values (that it to say, the withdrawn portion of the liquor not recycled to the cavity during the dissolution and cleaning phases) prior to being passed to a crystallizer and/or reactor. The addition may be carried out on at least a part of the liquor after but preferably prior to a pre-treatment step. The process thus may include the following:
  withdrawing at least a portion of the liquor to the surface;
  adding solid virgin trona and/or calcined trona to said liquor portion to increase the content in total sodium carbonate and to form an enriched liquor containing at least 20% by weight of sodium carbonate;

optionally, pre-treating said enriched liquor; and
recovering at least one alkali value, for example passing said enriched liquor to a crystallizer and/or reactor in which crystals of at least one sodium-based product are produced.

In some embodiments according to the second aspect of the present invention, the process may further comprise removing at least a portion of the undesirable solutes from the liquor (comprising at least a portion of the first liquor and/or at least a portion of the second liquor) which is used to recover alkali values. Such removal may include removal of organics for example via carbon adsorption and/or filtration prior to being passed to a crystallizer/reactor and/or an electrodialysis unit.

In some embodiments, the process may further comprise removing insoluble material from the liquor comprising at least a portion of the first liquor and/or second liquor which is used to recover alkali values, as some of the insoluble material may have precipitated once the liquor is withdrawn to the surface. Such removal may include sedimentation and/or filtration prior to being passed to a crystallizer and/or reactor.

According to the third aspect of the present invention, at least one sodium-based product, preferably selected from the group of consisting of sodium sesquicarbonate, sodium carbonate monohydrate, sodium carbonate decahydrate, sodium carbonate heptahydrate, anhydrous sodium carbonate (soda ash), sodium bicarbonate, sodium sulfite, sodium bisulfite, and sodium hydroxide, more preferably selected from the group of consisting of sodium sesquicarbonate, sodium carbonate monohydrate, sodium carbonate decahydrate, anhydrous sodium carbonate (soda ash), sodium bicarbonate, and sodium hydroxide, may be obtained by any of the aforementioned embodiments of the manufacturing process which utilizes the solution mining method according to the present invention.

The present invention would allow the mine operator to periodically clean a cavity being mined without having to continuously use high solvent pH, high hydroxide content (e.g., high NaOH content) and/or high solvent temperature during solution mining of such cavity. Such cleaning (whether it be one-time, intermittent or periodic) may impact the surface operation of the process for manufacturing at least one sodium-based product, because the composition and the temperature/pH of the various liquors withdrawn from the ore formation during the various steps would vary over the course of exploitation of the same cavity. However when the mine operator concurrently mines a plurality of cavities (preferably, exploited independently, i.e., there is no or little underground fluid communication between these cavities), it is believed that the impact of the OH/pH/temperature changes and the bicarbonate/carbonate concentration changes of the (second) liquor extracted from one cavity being cleaned according to the present cleaning phase (b) may be minimal on the manufacturing process, because the (second) liquor may be pooled with a plurality of (first) liquors obtained from other cavities being operated according to the present dissolution phase (a).

According to some particular embodiments of the second aspect of the present invention, the process for manufacturing at least one sodium-based product, may comprise:
providing a plurality of cavities in an underground ore, said ore comprising trona and/or wegscheiderite;
carrying out the dissolution phase (a) of the solution mining method according to the present invention in a first subset of said plurality of cavities to obtain a first liquor comprising sodium carbonate and sodium bicarbonate from each cavity of the first subset, while carrying out the cleaning phase (b) of the solution mining method according to the present invention in a second subset of said plurality of cavities to obtain from each cavity of the second subset a second liquor comprising sodium carbonate and sodium bicarbonate with a content in sodium bicarbonate less than said first liquors;
pooling some of or all of the first liquors which are withdrawn from each cavity of the first subset to the ground surface with some of or all of the second liquors which are withdrawn from each cavity of the second subset to the ground surface to form a (pooled) liquor; and
passing at least a portion of said (pooled) liquor through one or more units selected from the group consisting of a crystallizer, a reactor, and an electrodialysis unit, to form at least one sodium-based product; and
recovering said at least one sodium-based product.

In some embodiments, the pooled liquor may be pre-treated as described above before being sent to the one or first units.

According to yet another particular embodiment of the second aspect of the present invention, the process for manufacturing at least one sodium-based product, may comprise:
providing a plurality of cavities in an underground ore, said ore comprising trona and/or wegscheiderite;
carrying out the dissolution phase (a) of the solution mining method according to the present invention in a first subset of said plurality of cavities to obtain a first liquor comprising sodium carbonate and sodium bicarbonate withdrawn from each cavity of the first subset, while carrying out the cleaning phase (b) of the solution mining method according to the present invention in a second subset of said plurality of cavities to obtain from each cavity of the second subset a second liquor comprising sodium carbonate and sodium bicarbonate with a content in sodium bicarbonate less than said first liquor(s);
pooling some of or all of the withdrawn first liquors or portions thereof subset to form a first pooled liquor; then passing at least a portion of said first pooled liquor through one or more first units selected from the group consisting of a crystallizer, a reactor, and an electrodialysis unit, to form at least a first sodium-based product; and recovering this first sodium-based product; and
pooling some of or all of the withdrawn second liquors or portions thereof to form a second pooled liquor; then passing at least a portion of the second first pooled liquor through one or more second units being different than the first unit(s) and being independently selected from the group consisting of a crystallizer, a reactor, and an electrodialysis unit, to form at least a second sodium-based product; and recovering this second sodium-based product.

In some embodiments, the first pooled liquor may be pre-treated as described above before being sent to the one or more first units; and/or the second pooled liquor may be pre-treated as described above before being sent to the one or more second units. The plurality of cavities may comprise from 2 to 100 or even more cavities, being independently exploited for recovering alkali values. The first subset of the plurality of cavities in which the ore dissolution phase is carried out comprises at least one cavity, or comprises preferably at least 66%, more preferably at least 80%, most preferably at least 90% of the total number of cavities in the plurality. The second subset of the plurality of cavities in which the cavity cleaning phase is carried out comprises at least one cavity or comprises preferably at most 33%, more preferably at most 20%, most preferably at most 10% of the total number of cavities in the plurality.

The disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

Accordingly, the scope of protection is not limited by the description set out above, but is only limited by the claims which follow, that scope including all equivalents of the subject matter of the claims.

Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

The invention claimed is:

1. A method for recovering alkali values from at least one cavity of an underground ore formation, said ore comprising trona and/or wegscheiderite, said method comprising:
   carrying out an ore dissolution phase (a) into the at least one cavity, said ore dissolution phase comprising dissolving in situ at least a portion of ore from an ore face of the cavity into a first aqueous solvent to form a first liquor comprising sodium carbonate and to deposit sodium bicarbonate on at least a portion of the ore face;
   carrying out a cavity cleaning phase (b) into the same cavity where the ore dissolution phase (a) takes place in order for at least a portion of said deposited sodium bicarbonate to be removed from the ore face, said cleaning phase (b) comprising dissolving in situ at least a portion of the deposited sodium bicarbonate and optionally dissolving in situ at least a portion of the ore from the ore face into a second aqueous solvent to form a second liquor comprising sodium carbonate, said second aqueous solvent having a parameter selected from the group consisting of pH, hydroxide concentration, temperature, and any combinations of two or more thereof, which has a higher value than the first aqueous solvent used in the dissolution phase (a); and
   repeating the ore dissolution phase (a).

2. The method according to claim 1, wherein the second aqueous solvent comprises at least a portion of the first aqueous solvent used in the dissolution phase (a).

3. The method according to claim 1, wherein the second aqueous solvent is formed ex situ by carrying out a step selected from the group consisting of: adding steam; adding a hot stream with a temperature higher than said first aqueous solvent; adding a base; and combinations thereof; to at least a portion of said first aqueous solvent which is used in the ore dissolution phase (a), before the so-formed second aqueous solvent is injected into the cavity for the cavity cleaning phase (b) to be initiated.

4. The method according to claim 1, further comprising: passing at least a portion of the first or second liquor withdrawn from the cavity through at least one electrodialysis unit to generate a sodium hydroxide-containing solution, said sodium hydroxide-containing solution providing at least a portion of said second aqueous solvent.

5. The method according to claim 1, wherein the parameter of the second aqueous solvent which has a higher value than the parameter of the first aqueous solvent is selected so as to maintain the sodium bicarbonate concentration in the second liquor below 8% by weight.

6. The method according to claim 1, wherein the first and second aqueous solvents both comprise sodium carbonate at a concentration below the sodium carbonate saturation level under the operating conditions used in their respective phases (a) and (b), and wherein the second liquor comprises sodium bicarbonate at a concentration below the sodium bicarbonate saturation level.

7. The method according to claim 1, wherein the second aqueous solvent comprises a base selected from the group consisting of sodium hydroxide, potassium hydroxide, calcium hydroxide, ammonium hydroxide, magnesium hydroxide, and any combinations of two or more thereof, and wherein the first aqueous solvent excludes said base.

8. The method according to claim 1, wherein the second aqueous solvent comprises sodium hydroxide at a concentration from 0.5 to 10% by weight.

9. The method according to claim 1, wherein the ore dissolution phase (a) is carried out for a first period of time; and wherein the cavity cleaning phase (b) is carried out for a second period of time which is shorter than the first period of time.

10. The method according to claim 1, wherein the second aqueous solvent has a higher flow rate than the first aqueous solvent.

11. The method according to claim 1, wherein said the parameter of said second aqueous solvent has a pH or hydroxide concentration which has a higher value than that of the first aqueous solvent used in the ore dissolution phase (a), and wherein said pH or hydroxide concentration of said second aqueous solvent is effective in converting at least some of the dissolved sodium bicarbonate to sodium carbonate in the second liquor, and is further effective in preventing redeposition of sodium bicarbonate onto the dissolving ore face during the cavity cleaning phase (b).

12. The method according to claim 1, wherein the second aqueous solvent has a higher surface temperature than the first aqueous solvent.

13. The method according to claim 1, wherein the first solvent is injected into the cavity via a well, while the first liquor is withdrawn to the surface by another well, and wherein the second solvent is injected into the cavity via the same well used to withdraw the first liquor, while the second liquor is withdrawn to the surface by the same well used to inject the first solvent.

14. The method according to claim 1 wherein the cavity is created by the following steps: drilling a directionally-drilled well comprising an uncased horizontal portion and also drilling a vertical well which has a downhole end intersecting the uncased horizontal portion of the directionally-drilled well to provide fluid communication between the two wells.

15. The method according to claim 1, wherein the cavity is created by the following steps: hydrofracturing the underground ore formation for establishing fluid communication between an injection well and a production well; maintaining sufficient hydraulic pressure in such formation for propping open fractures; and circulating a solvent liquid through such fractures for dissolving water-soluble constituents of the ore to create such cavity.

16. The method according to claim 1, being carried out in a plurality of cavities in said ore formation, and wherein the method comprises:

carrying out the first ore dissolution phase (a) of solution mining in a first subset of cavities from said plurality to obtain, from each cavity of the first subset, a first liquor comprising sodium carbonate and sodium bicarbonate, while at the same time carrying out the second cavity cleaning phase (b) of solution mining in a second subset of different cavities from said plurality to obtain, from each cavity of the second subset, a second liquor comprising sodium carbonate and sodium bicarbonate; and pooling some of or all of the first liquors or portions thereof which are withdrawn from each cavity of the first subset to the ground surface with some of or all of the second liquors or portions thereof which are withdrawn from each cavity of the second subset to the ground surface to form a pooled liquor;

optionally pre-treating the pooled liquor;

passing at least a portion of said optionally-pretreated pooled liquor through one or more units selected from the group consisting of a crystallizer, a reactor, and an electrodialysis unit, to form at least one sodium-based product; and recovering said at least one sodium-based product.

17. The method according to claim 1, being carried out in a plurality of cavities in said ore formation, and wherein the method comprises:

carrying out the first ore dissolution phase (a) of solution mining in a first subset of said plurality of cavities to obtain a first liquor comprising sodium carbonate and sodium bicarbonate withdrawn from each cavity of the first subset, while carrying out the second cavity cleaning phase (b) of solution mining in a second subset of said plurality of cavities to obtain from each cavity of the second subset a second liquor comprising sodium carbonate and sodium bicarbonate with a content in sodium bicarbonate less than said first liquor(s);

pooling some of or all of the withdrawn first liquors or portions thereof subset to form a first pooled liquor; optionally pre-treating said first pooled liquor; then passing at least a portion of said optionally-pretreated first pooled liquor through one or more first units selected from the group consisting of a crystallizer, a reactor, and an electrodialysis unit, to form at least a first sodium-based product; and recovering this first sodium-based product; and pooling some of or all of the withdrawn second liquors or portions thereof to form a second pooled liquor; optionally pre-treating said second pooled liquor; then passing at least a portion of the optionally-pretreated second pooled liquor through one or more second units being different than the first unit(s) and being independently selected from the group consisting of a crystallizer, a reactor, and an electrodialysis unit, to form at least a second sodium-based product; and recovering this second sodium-based product.

18. A manufacturing process for making one or more sodium-based products from an underground ore formation, said ore comprising trona and/or wegscheiderite, said process comprising:

carrying out the method for recovering alkali values according to claim 1 to obtain a liquor comprising sodium carbonate and/or sodium bicarbonate, said liquor comprising at least a portion of said first liquor obtained in said ore dissolution phase (a), at least a portion of said second liquor obtained in said cavity cleaning phase (b), or any combinations of at least a portion of said first liquor and at least a portion of said second liquor; and passing at least a portion of said liquor through one or more units selected from the group consisting of a crystallizer, a reactor, and an electrodialysis unit, to form at least one sodium-based product; and recovering said at least one sodium-based product.

19. The method according to claim 1, wherein the parameter is a surface parameter before solvent injection into the cavity.

* * * * *